US012603377B2

(12) United States Patent
Wang et al.

(10) Patent No.: US 12,603,377 B2
(45) Date of Patent: Apr. 14, 2026

(54) PROTECTIVE COVER, BATTERY, POWER CONSUMING DEVICE, AND METHOD FOR MANUFACTURING PROTECTIVE COVER

(71) Applicant: CONTEMPORARY AMPEREX TECHNOLOGY (HONG KONG) LIMITED, Hong Kong (CN)

(72) Inventors: Hongqi Wang, Ningde (CN); Yangyang Sun, Ningde (CN); Bo Wu, Ningde (CN); Jianhua Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 585 days.

(21) Appl. No.: 18/109,278

(22) Filed: Feb. 14, 2023

(65) Prior Publication Data

US 2023/0198075 A1     Jun. 22, 2023

Related U.S. Application Data

(63) Continuation of application No. PCT/CN2021/115079, filed on Aug. 27, 2021.

(51) Int. Cl.
*H01M 50/273*          (2021.01)
*H01M 50/262*          (2021.01)
(Continued)

(52) U.S. Cl.
CPC ....... *H01M 50/273* (2021.01); *H01M 50/262* (2021.01); *H01M 50/282* (2021.01); *H01M 50/296* (2021.01)

(58) Field of Classification Search
None
See application file for complete search history.

(56) References Cited

U.S. PATENT DOCUMENTS 5,156,291 A      10/1992  Mielke
5,848,904 A  *  12/1998  Kikuchi ............. H01R 13/4534
                                                         439/911
(Continued)

FOREIGN PATENT DOCUMENTS

CN          101932216 A       12/2010
CN          104389146 A       3/2015
(Continued)

OTHER PUBLICATIONS

Office Action issued Feb. 26, 2024 in Japanese Patent Application No. 2023-501780 with machine English translation thereof, 8 pages.
(Continued)

*Primary Examiner* — Gregg Cantelmo
(74) *Attorney, Agent, or Firm* — XSENSUS LLP

(57) ABSTRACT
A protective cover may comprise: a first cover configured to be fixed to a frame of a battery, the first cover being provided with an accommodating cavity for accommodating a high-voltage lead-out structure, and the accommodating cavity having an opening for exposing the high-voltage lead-out structure; a second cover rotatably arranged on the first cover and opening and respectively closing the opening when rotated relative to the first cover in a first direction of rotation and a second direction of rotation; and a cover closing structure connected to the first cover and the second cover, and causing the second cover to rotate in the second direction of rotation after the second cover is opened and an external force for opening the second cover is removed.

20 Claims, 11 Drawing Sheets

(51) Int. Cl.
      *H01M 50/282*       (2021.01)
      *H01M 50/296*       (2021.01)

(56)                  References Cited

U.S. PATENT DOCUMENTS

2004/0228072 A1 *   11/2004   Chen ..................... H01M 50/00
                                                          361/600
2019/0027733 A1      1/2019   Hashimoto
2020/0168866 A1 *    5/2020   Sakagami ........... H01M 50/249

FOREIGN PATENT DOCUMENTS

| | | | |
|---|---|---|---|
| CN | 205303561 U | 6/2016 | |
| CN | 211557457 U | 9/2020 | |
| CN | 112332006 A | 2/2021 | |
| CN | 213026377 U | 4/2021 | |
| EP | 0849832 A2 * | 6/1998 | ........... H01R 13/447 |
| JP | H06-19126 Y | 5/1994 | |
| JP | H08-184254 A | 7/1996 | |
| JP | 2003-217734 A | 7/2003 | |
| JP | 2004-119340 A | 4/2004 | |
| JP | 2015-032408 A | 2/2015 | |
| JP | 2016-143554 A | 8/2016 | |
| JP | 2019-021593 A | 2/2019 | |

OTHER PUBLICATIONS

International Search Report mailed on Apr. 26, 2022, received for
PCT Application PCT/CN2021/115079, filed on Aug. 27, 2021, 10
pages including English Translation.
European Search Report mailed Oct. 31, 2023, in European Appli-
cation No. 21949537.1, 10 pages.

* cited by examiner

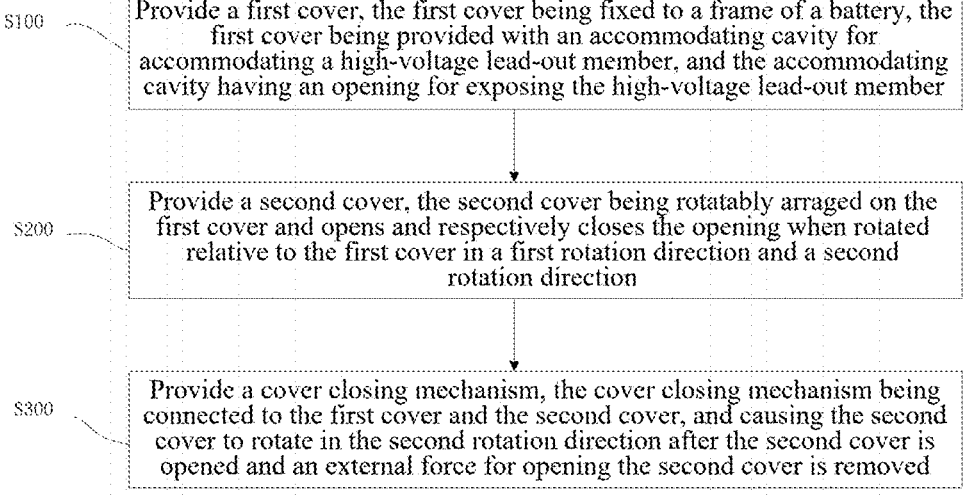

S100

Provide a first cover, the first cover being fixed to a frame of a battery, the first cover being provided with an accommodating cavity for accommodating a high-voltage lead-out member, and the accommodating cavity having an opening for exposing the high-voltage lead-out member

S200

Provide a second cover, the second cover being rotatably arraged on the first cover and opens and respectively closes the opening when rotated relative to the first cover in a first rotation direction and a second rotation direction

S300

Provide a cover closing mechanism, the cover closing mechanism being connected to the first cover and the second cover, and causing the second cover to rotate in the second rotation direction after the second cover is opened and an external force for opening the second cover is removed

*FIG. 37*

PROTECTIVE COVER, BATTERY, POWER CONSUMING DEVICE, AND METHOD FOR MANUFACTURING PROTECTIVE COVER

CROSS REFERENCE TO RELATED APPLICATION

The present application is a continuation of International Application No. PCT/CN2021/115079, filed Aug. 27, 2021, the entire content of which is incorporated herein by reference in its entirety.

TECHNICAL FIELD

The present application relates to the field of batteries, and in particular to a protective cover, a battery, a power consuming device, and a method for manufacturing a protective cover.

BACKGROUND ART

Energy conservation and emission reduction are the key to the sustainable development of the automobile industry. In this case, electric vehicles have become an important part of the sustainable development of the automotive industry due to their advantages in energy conservation and environmental protection. For the electric vehicles, battery technology is an important factor in their development.

In the development of the battery technology, the safety is also a non-negligible issue, in addition to improving the performance of batteries. The battery safety is related not only to thermal runaway caused by a chemical system of the battery, but also to relevant high-voltage electrical aspects of the battery.

SUMMARY OF THE DISCLOSURE

In view of the above issue, the present application provides a protective cover, a battery, a power consuming device, and a method for manufacturing the protective cover, in order to improve the safety of the battery.

For achieving some of the above objects, the protective cover provided according to some embodiments of the present application comprises:

a first cover configured to be fixed to a frame of a battery, the first cover being provided with an accommodating cavity for accommodating a high-voltage lead-out member, and the accommodating cavity having an opening for exposing the high-voltage lead-out member;

a second cover rotatably arranged on the first cover and opening and respectively closing the opening when rotated relative to the first cover in a first direction of rotation and a second direction of rotation; and a cover closing mechanism connected to the first cover and the second cover, and causing the second cover to rotate in the second direction of rotation after the second cover is opened and an external force for opening the second cover is removed.

Based on above-described arrangement, the second cover may also be automatically rotated toward a closed position under the action of the cover closing mechanism, such that the risk of forgetting to close the second cover may be reduced, a safety issue caused by forgetting to close the second cover may be prevented, and it is conducive to improving use safety.

In some embodiments, the cover closing mechanism comprises an elastic member connected to the first cover and the second cover, and an elastic restoring force of the elastic member drives the second cover to rotate in the second direction of rotation after the external force for opening the second cover is removed.

The elastic member provided can drive the second cover to return automatically, preventing the safety risk caused by the operator forgetting to close the second cover.

In some embodiments, the elastic member comprises a spring, wherein a first end of the spring is connected to the first cover, and a second end of the spring is connected to the second cover, such that the second cover is rotated in the second direction of rotation under the drive of the elastic restoring force of the spring after the external force for opening the second cover is removed.

The provision of the spring makes it possible to achieve a fully automatic cover closing process and automatic maintenance of a closed state after the cover is closed on the basis of a simple structure, which is conducive to further improving the use safety.

In some embodiments, the first end of the spring is engaged with the first cover; and/or the second end of the spring is engaged with the second cover. The engagement makes the structure simple and the assembly easy.

In some embodiments, a first limiting cavity is provided in the first cover, and the spring is arranged in the first limiting cavity. Since the first limiting cavity may limit the spring to a certain extent reliability of arrangement of the spring on the first cover may be improved, which is conducive to fully and reliably achieving the automatic resilient function of the spring.

In some embodiments, the first cover comprises a base and a first cover cap, where the base is provided with a first groove, and the first cover cap is removably connected to the base and covers the first groove to form the first limiting cavity. The first limiting cavity is formed by the first cover cap covering over the base, such that the spring may be effectively limited. Furthermore, the first cover cap is removably connected to the base to facilitate the dismounting or mounting of components such as the spring located in the first limiting cavity.

In some embodiments, the first cover cap is engaged with the base. The engagement makes the structure simple and the assembly easy.

In some embodiments, a groove is provided in the base, a connecting rib is provided on the first cover cap, a convex rib is provided on the connecting rib, and the connecting rib is engaged into the groove and is in interference fit with the groove by means of the convex rib to prevent the connecting rib from sliding out of the groove. In this way, the first cover cap is reliably connected to the base and is less likely to slip off, which is conducive to implement robust mounting of the first cover cap on the base and facilitates reliable limiting by the first cover on the spring, etc.

In some embodiments, the second cover comprises a rotating shaft and a cover body, where the rotating shaft is rotatably arranged on the first cover, the cover body is connected to the rotating shaft and opens and closes the opening, and the second end of the spring is connected to the rotating shaft. On this basis, it is easy for the second end of the spring to rotate together with the second cover so as to smoothly achieve the automatic return function.

In some embodiments, the elastic member comprises the connecting pieces, and the second cover is rotatably connected to the first cover by means of the connecting pieces such that an elastic restoring forces of the connecting pieces drive the second cover to rotate in the second direction of rotation after the external force for opening the second cover is removed. In this way, the connecting pieces form a thin-walled hinge structure, which is used not only for implementing the rotational connection of the first cover and the second cover, but also for driving the second cover to return automatically, in order to avoid the risk of electric shock due to the operator forgetting to close the second cover.

In some embodiments, the connecting pieces meet at least one of:

the thickness of the connecting piece being less than or equal to 0.7 mm;

the tensile strength of the material of the connecting piece being between 20 and 50 MPa;

the elongation at break of the material of the connecting piece being less than or equal to 15%;

the material of the connecting piece has a bending strength of 30-80 MPa;

the Charpy notched impact strength of the material of the connecting piece being less than or equal to 35 KJ/m²; and the width of the connecting piece being greater than or equal to 3 mm.

The connecting pieces meeting at least one of the above-described conditions has a good toughness and can generate a good recoverable deformation, which is conducive to reliably driving the second cover to automatically return; and the connecting pieces also has an appropriate hardness, is easy to bend and is less like to undergo brittle fractures, which is conducive to implementing repeated opening and closing.

In some embodiments, the connecting pieces are made of nylon material. Thereby, the connecting pieces with a good performance can be obtained, so as to smoothly achieve the automatic rebound function.

In some embodiments, the connecting pieces are made of PA6 material. Thereby, the connecting pieces with an excellent performance can be obtained, so as to smoothly achieve the automatic rebound function.

In some embodiments, the cover closing mechanism or structure comprises at least two connecting pieces, where the at least two connecting pieces are spaced apart in an extension direction of an axis of rotation of the second cover.

In some embodiments, the protective cover comprises a speed reducer, where the speed reducer is connected to the first cover and the second cover, and applies, when the cover closing mechanism causes the second cover to rotate in the second rotational direction, an acting force to the second cover in the first rotational direction so as to reduce a closing speed of the second cover. In this way, sufficient time can be reserved for dismounting or mounting the high-voltage lead-out member.

In some embodiments, the speed reducer is engaged with the first cover; and/or the speed reducer is engaged with the second cover. The engagement makes the structure simple and the assembly easy.

In some embodiments, the speed reducer and the spring of the cover closing mechanism are arranged on two opposite sides of the second cover. In this way, it is more advantageous for the speed reducer and the spring to apply rotational acting forces in opposite directions to the second cover when the second cover is rotated, the layout is more rational, and the overall structure is more simple and compact.

In some embodiments, a second limiting cavity is provided in the first cover, and the speed reducer is provided in the second limiting cavity. Since the second limiting cavity can limit the speed reducer to a certain extent, it is possible to improve the reliability of arrangement of the speed reducer on the first cover.

In some embodiments, the first cover comprises a base and a second cover cap, where the base is provided with a first groove, and the second cover cap is removably connected to the base and covers the first groove to form the second limiting cavity. In this arrangement, the second limiting cavity is formed by the second cover cap covering over the base, and can effectively limit the speed reducer. In addition, the second cover cap is removably connected to the base to facilitate dismounting or mounting of components such as the speed reducer located in the second limiting cavity.

In some embodiments, the speed reducer comprises a damper. In this way, the automatic closing speed of the second cover can be reliably reduced.

In some embodiments, a free end of the second cover is connected to the first cover by means of a snap-fit structure or a magnetic attraction structure. In this way, the connection between the free end of the second cover and the first cover is more robust, and after the second cover returns to the closed position under the action of the cover closing mechanism, the second cover can be more stably maintained in the closed position to sufficiently cover the high-voltage lead-out member, effectively reducing the risk of electric shock.

In some embodiments, the first cover has a limiting portion that is in contact with the second cover to limit the maximum opening angle of the second cover. On this basis, it is easy to adjust the maximum opening angle of the second cover by adjusting the position and/or the structure of the limiting portion.

In some embodiments, the limiting portion limits the maximum opening angle of the second cover to be greater than or equal to 180°. In this way, the high-voltage lead-out member can be sufficiently exposed to provide a spacious operating space for the operator, facilitating the operation by the operator, and improving the efficiency of dismounting, mounting and maintenance by the operator.

In some embodiments, a grip portion is provided on the second cover to facilitate the rotation of the second cover by the operator.

In addition, the present application further provides a battery comprising a battery cell, a frame and a high-voltage lead-out member, where the battery cell is arranged in the frame, and the high-voltage lead-out member is arranged on the frame and is electrically connected to the battery cell. The battery further comprises the protective cover of the embodiment of the present application. Since the protective cover can be closed automatically, the safety performance of the battery is good.

In some embodiments, the battery comprises an outer case comprising a case cover, where the frame is arranged in the outer case, an inner wall of the case cover is provided with a receding groove, and the receding groove avoids the second cover to prevent the second cover from interfering with the case cover during its rotation. Thus, smooth opening and closing of the second cover are facilitated.

Furthermore, one embodiment of the present application further provides a power consuming device that comprises the battery for providing electrical energy of the embodiment of the present application. Since the protective cover can be closed automatically, the safety performance of the power consuming device is good.

Moreover, one embodiment of the present application further provides a method for manufacturing a protective cover of the various embodiments, the method comprising:

providing a first cover, the first cover being fixed to a
frame of a battery, the first cover being provided with
an accommodating cavity for accommodating a high-
voltage lead-out member, and the accommodating cav-
ity having an opening for exposing the high-voltage
lead-out member;

providing a second cover, the second cover being rotat-
ably arranged on the first cover and respectively open-
ing or closing the opening when rotated relative to the
first cover in a first direction of rotation and a second
direction of rotation; and providing a cover closing mechanism, the cover closing
mechanism being connected to the first cover and the
second cover, and causing the second cover to rotate in
the second direction of rotation after the second cover
is opened and an external force for opening the second
cover is removed.

The protective cover manufactured by the above method
has the automatic closing function, and can improve the
safety performance of the battery and the power consuming
device.

The aforementioned description is only an overview of
the technical solutions of the present application. In order to
more clearly understand the technical means of the present
application to implement same according to the contents of
the specification, and in order to make the aforementioned
and other objects, features and advantages of the present
application more obvious and understandable, specific
embodiments of the present application are exemplarily
described below.

BRIEF DESCRIPTION OF THE DRAWINGS

Various other advantages and benefits will become appar-
ent to those of ordinary skill in the art upon reading the
following detailed description of preferred embodiments.
The drawings are merely for the purpose of illustrating the
preferred embodiments and are not to be construed as
limiting the present application. Moreover, like components
are denoted by like reference numerals throughout the
drawings. In the drawings:

FIG. 20 is a schematic perspective view of the first cover
cap according to the first embodiment of the present appli-
cation.

FIG. 21 is a schematic perspective view of the second
cover cap according to the first embodiment of the present
application.

FIG. 22 is a schematic enlarged view of part III of FIG.
21.

FIG. 23 is a side view of the second cover cap according
to the first embodiment of the present application.

FIG. 24 is a schematic enlarged view of part IV of FIG.
23.

FIG. 37 illustrates a method for manufacturing a protective cover according to an embodiment of the present application.

LIST OF REFERENCE SIGNS

Figure 1:
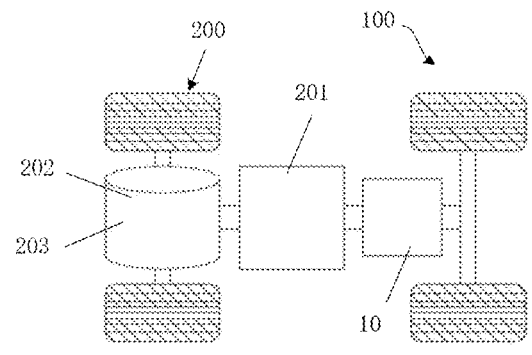
FIG. 1 is a schematic structural diagram of a power
consuming device according to an embodiment of the pres-
ent application.

100. Power consuming device; 200. Vehicle; 201. Controller; 202. Power apparatus; 203. Motor;

10. Battery; 101. Battery cell; 102. Frame; 103. Base; 104. Protective cover; 105. High-voltage lead-out member or structure; 106. Fastener; 107. Outer case; 108. Case cover; 109. Receding groove; 10*a*. End cap; 10*b*. Side plate; 10*c*. End plate;

1. First cover; 11. Base; 111. Accommodating portion; 112. Supporting portion; 113. First supporting body; 114. Second supporting body; 115. Abutment; 116. Bump; 117. Connecting shaft; 118. Projecting rib; 119. Arc-shaped rib; 12. First cover cap; 13. Second cover cap; 14. Accommodating cavity; 15. Opening; 16. Limiting portion; 11*a*. Insertion opening; 11*b*. First limiting cavity; 11*c*. Second limiting cavity; 11*d*. Engaging opening; 11*e*. Groove; 11*f*. Connecting rib; 11*g*. First groove; 11*h*. Convex rib; 11*k*. Second groove; 11*m*. Third groove; 11*n*. Mounting groove;

2. Second cover; 21. Rotating shaft; 211. First shaft body; 212. Second shaft body; 213. Third shaft body; 214. First engaging groove; 215. Second engaging groove; 22. Cover body; 221. First cover body; 222. Second cover body; 223. Third cover body; 224. Slot;

3. Cover closing mechanism or structure; 3*a*. Elastic member or structure; 31. Spring; 311. First end; 312. Second end; 32. Connecting piece;

4. Speed reducer; 41. Damper; 411. Inner damper; 412. Outer damper; 413. Engaging block; 414. Boss;

5. Grip portion;

6. Snap-fit structure; 61. Limiting block; 62. Limiting groove;

7. Magnetic attraction structure; 71. First magnetic attraction member; 711. Recess; 72. Second magnetic attraction member.

DETAILED DESCRIPTION OF EMBODIMENTS

Embodiments of the technical solutions of the present application will be described in more detail below with reference to the drawings. The following embodiments are merely intended to more clearly illustrate the technical solutions of the present application, so they merely serve as examples, but are not intended to limit the scope of protection of the present application.

Unless otherwise defined, all technological and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the specification and the claims of the present application as well as the description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the technical features modified thereby. In the description of the embodiments of the present application, the phrase "a plurality of" means two or more, unless otherwise explicitly and specifically defined.

The phrase "embodiment" mentioned to herein means that the specific features, structures and characteristics described in combination with the embodiment may be included in at least one of the embodiments of the present application. The phrase at various locations in the specification does not necessarily refer to the same embodiment, or an independent or alternative embodiment exclusive of another embodiment. Those skilled in the art understand explicitly or implicitly that an embodiment described herein may be combined with another embodiment.

In the description of the embodiments of the present application, the term "and/or" is merely intended to describe the associated relationship of associated objects, representing that three relationships can exist, for example, A and/or B can include: the three instances of A alone, A and B simultaneously, and B alone. In addition, the character "/" herein generally indicates an "or" relation between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counterclockwise", "axial", "radial", "circumferential", etc. are based on the orientation or position relationship shown in the drawings and are merely intended to facilitate and simplify the description of the embodiments of the present application, rather than indicating or implying that the device or element considered must have a particular orientation or be constructed and operated in a particular orientation, and therefore not to be construed as limiting the embodiments of the present application.

In the description of the embodiments of this application, unless otherwise explicitly specified and defined, the technical terms "mounting", "mutual connection", "connection" and "fixing" should be understood in a broad sense, for example, they may be a fixed connection, a detachable connection, or an integrated connection; may be a mechanical connection or an electrical connection; and may be a direct connection or an indirect connection through an intermediate medium, and may be communication between interiors of two elements or interaction between the two elements. For those of ordinary skill in the art, the specific meaning of the above terms in the embodiments of the present application can be understood according to specific situations.

At present, traction batteries are applied more and more widely. The traction batteries are not only used in energy storage power systems such as hydroelectric power plants, thermal power plants, wind power plants and solar power plants, but also widely used in electric transportation means such as electric bicycles, electric motorcycles and electric vehicles and in many fields such as military equipment and aerospace. With the continuous expansion of the application field of the traction batteries, there is also increasing requirements for the performance thereof.

Safety is an important performance index of the batteries. During the use and routine maintenance of the batteries, it is necessary to prevent safety accidents such as electric leakage or accidental electric shock.

In a battery, a battery cell is provided in a frame, and a high-voltage lead-out member or structure is provided on the frame, and the high-voltage lead-out member is electrically connected to the battery cell so as to achieve voltage output. As a means for improving the battery safety, the battery typically comprises a protective cover that covers the high-voltage lead-out member of the battery so as to cover and protect the high-voltage lead-out member and to prevent the electrical shock problem caused by exposure of the high-voltage lead-out member. The high-voltage lead-out member is used for leading out electrical energy, and is at a high voltage. If a person directly touches the high-voltage lead-out member, it may cause a human casualty accident by electric shock.

As a structural form of the protective cover, the protective cover comprises a first cover and a second cover, wherein the second cover is rotatably connected to the first cover to achieve opening or closing of the protective cover, thus exposing or covering the high-voltage lead-out member. Normally, the protective cover is in a closed state to cover the high-voltage lead-out member, preventing accidental electric shock. When it is necessary to remove the high-pressure lead-out member, the second cover is rotated to open the protective cover and to expose the high-pressure lead-out member, so as to facilitate the mounting or dismounting of the high-pressure lead-out member.

Although the safety of the battery can be improved to a certain extent by providing the above-described protective cover, it is found in practice that an operator may forget to rotate and close the second cover after mounting or dismounting of the high-voltage lead-out member, which results in an inactive protective function of the protective cover and large-area exposure of the high-voltage lead-out member, so there is still the risk of accidental electric shock.

Based on the above-described findings, in order to further improve the safety of a battery, the present application provides a protective cover, a battery, a power consuming device, and a method for manufacturing a protective cover. By improving the structure of the protective cover, the protective cover can be automatically closed after an external force for opening the protective cover is eliminated, so as to reduce the risk of forgetting to close the protective cover and to avoid a safety accident caused by forgetting to close the protective cover.

FIGS. 1-37 illustrate structures of a power consuming device, a battery and a protective cover, and a flowchart of a method for manufacturing a protective cover according to some embodiments of the present application.

Figure 3:
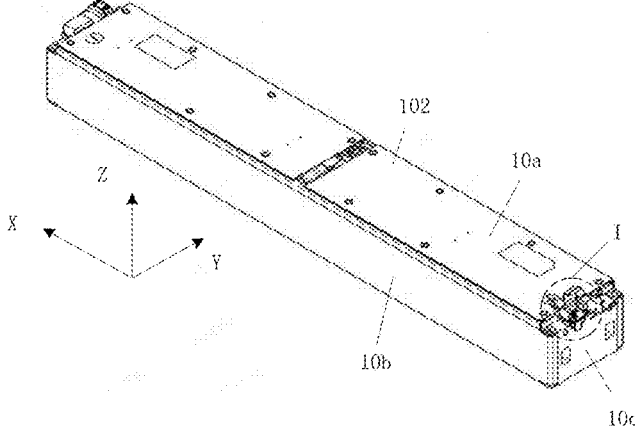
FIG. 3 is a schematic perspective structural diagram of the
battery with an outer case removed according to the first
embodiment of the present application.

For ease of description, various directions are first defined using a coordinate system in FIG. 3. An axis Z represents a height direction of the battery, which is also referred to as a first direction Z. An axis X is perpendicular to the axis Z and represents a lengthwise direction of the battery, which is also referred to as a second direction X. An axis Y is perpendicular to both the axis X and the axis Y and represents a width direction of the battery, which is also referred to as a third direction Y. Thus, the first direction Z, the second direction X and the third direction Y are perpendicular to each other. On the basis of thus defined orientations, a direction corresponding to the first direction Z is taken as an up-down direction, and a description of the orientation or positional relationship indicated by "up", "down", "top" and "bottom" is defined, wherein the orientation of the protective cover relative to the base is construed to be up, and the orientation of the base relative to the protective cover is construed to be down.

The present application will be described below with reference to FIGS. 1-37.

FIG. 1 illustrates a structure of a power consuming device according to some embodiments of the present application. Referring to FIG. 1, the power consuming device 100 is a device that uses a battery 10 as a power source and comprises the battery 10, the battery 10 being configured for providing electrical energy.

The power consuming device 100 may be a mobile phone, a tablet, a notebook computer, an electric toy, a power tool, a battery car, an electric vehicle, a ship, a spacecraft, etc. The electric toy may include a stationary or mobile electric toy, such as a game machine, an electric toy car, an electric toy ship, an electric toy airplane, etc. The spacecraft may include an airplane, a rocket, an aerospace plane, a spaceship, etc.

The power consuming device 100 comprises a power source comprising the battery 10, wherein the battery 10 provides a driving force to the power consuming device 100. In some embodiments, all of the driving force of the power consuming device 100 results from electrical energy, in which case the power source comprises only the battery 10. In other embodiments, the driving force of the power consuming device 100 comprises electrical energy and other sources of energy (e.g., mechanical energy), in which case the power source comprises the battery 10 and other apparatuses such as an engine.

The case where the power consuming device 100 is a vehicle 200 is taken as an example. Referring to FIG. 1, in some embodiments, the power consuming device 100 is a new energy vehicle such as a battery electric vehicle, a hybrid vehicle, or an extended-range vehicle, and comprises the battery 10, a controller 201, and a power apparatus 202 such as a motor 203. The battery 10 is electrically connected to the power apparatus 202 such as the motor 203 by means of the controller 201, such that the battery 10 can supply power to the power apparatus 202 such as the motor 203 under the control of the controller 201. It can be seen that the battery 10 is an important component of the power consuming device 100.

FIGS. 2-8 illustrate the structure of the battery 10 according to some embodiments of the present application.

Referring to FIGS. 2-8, the battery 10 comprises a frame 102, a battery cell 101, a high-voltage lead-out member 105, and a protective cover 104.

The frame 102 is configured for storing the battery cell 101 and provides a mounting base for other components of the battery 10, such as the high-voltage lead-out member 105 and the protective cover 104. Referring to FIG. 3, in some embodiments, the frame 102 comprises two end caps 10a, two end plates 10c, and two side plates 10b. The two end caps 10a are arranged opposite one another in the first direction Z. The two end plates 10c are arranged opposite one another in the second direction X and are connected to the two end caps 10a. The two side plates 10b are arranged opposite one another in the third direction Y and are connected to the two end caps 10a and the two end plates 10c. In this manner, the two end caps 10a, the two end plates 10c, and the two end caps 10a jointly enclose the frame 102 having an accommodating space therein to store the battery cell 101 and to facilitate mounting of other components of the battery 10, such as the high-voltage lead-out member 105 and the protective cover 104.

Figures 4, 5, 6:
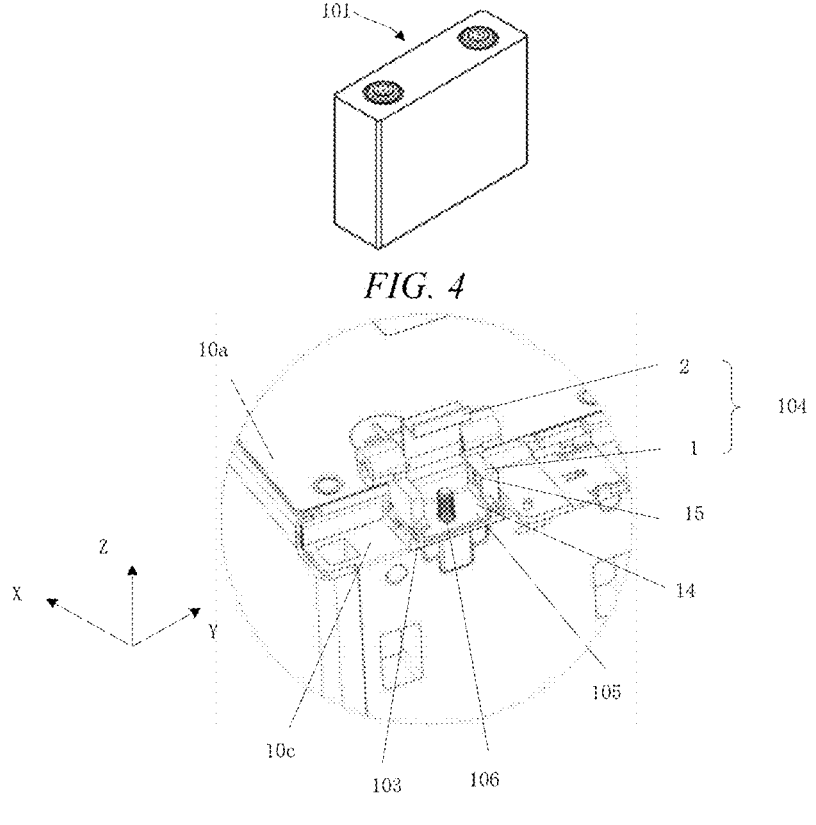
FIG. 4 is a schematic perspective structural diagram of a
battery cell according to the first embodiment of the present
application.
FIG. 5 is a schematic enlarged view of part I in FIG. 3.
FIG. 6 is a schematic diagram of the protective cover
mounted on a base in a closed state according to the first
embodiment of the present application.

The battery cell 101, which is a minimum battery unit for supplying electric power, is arranged in the frame 102 and is a core component of the battery 10. FIG. 4 illustrates the structure of the battery cell 101. In FIG. 4, the battery cell 101 is a cube-shaped secondary battery, but as a variant, the battery cell 101 may also be a secondary battery that is cylindrical, flat or in other shapes, or the battery cell 101 may be a primary battery.

It should be understood that the arrangement of the battery cell 101 in the frame 102 may vary. In some embodiments, a plurality of battery cells 101 are provided in the frame 102. These battery cells 101 are arranged side by side in the frame 102 and are in series connection, in parallel connection or in series-parallel connection to achieve high capacity or power.

The high-voltage lead-out member 105 is arranged on the frame 102 and is electrically connected to the battery cell 101 for achieving electrical energy output of the battery cell 101 in the frame 102. The battery cell 101 in the frame 102 achieves electrical energy output through the high-voltage lead-out member 105. Referring to FIGS. 3 and 5, in some embodiments, the high-voltage lead-out member 105 is arranged on the end plate 10c of the frame 102. Specifically, as shown in FIG. 5, in some embodiments, a base 103 is provided on the end plate 10c, and the high-voltage lead-out member 105 is connected to the base 103, and thus the mounting of the high-voltage lead-out member 105 on the end plate 10c is achieved. More specifically, in some embodiments, the high-voltage lead-out member 105 is connected to the base 103 by means of a fastener 106, such as a bolt.

Figure 7:
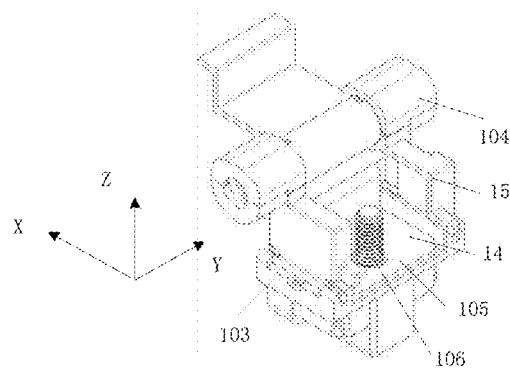
FIG. 7 is a schematic diagram of the protective cover
mounted on the base in an opened state according to the first
embodiment of the present application.
Figure 8:
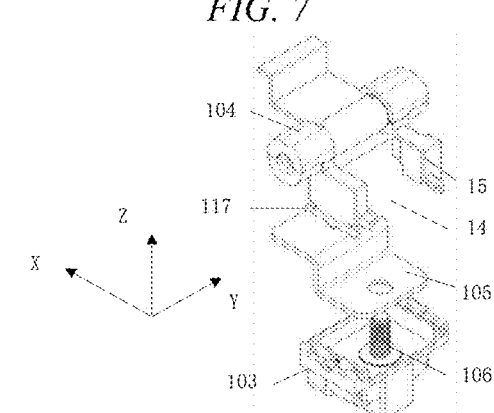
FIG. 8 is an schematic exploded view of FIG. 7.

The protective cover 104 covers the high-voltage lead-out member 105 to cover and protect the high-voltage lead-out member 105, preventing a person from accidentally touching the high-voltage lead-out member 105 by hand, and thus avoiding accidental electric shock. Referring to FIG. 5, in some embodiments, the protective cover 104 is arranged on the base 103. FIGS. 6-8 illustrate schematic diagrams of the protective cover 104 mounted on the base 103. As shown in FIGS. 6-8, in some embodiments, the protective cover 104 is rotatably connected to the base 103 by means of a connecting shaft 117, and in this case, the protective cover 104 is removably connected to the base 103 to facilitate the dismounting or mounting of the protective cover 104. Of course, in order to removably connect the protective cover 104 to the base 103, other connection means may also be used between the protective cover 104 and the base 103, such as snap-fitting, hole-pin fitting, or a combination of snap-fitting, rotating shaft fitting and hole-pin fitting.

The frame 102, the battery cell 101 located inside the frame 102, and the base 103, the high-voltage lead-out member 105, the protective cover 104, etc. located on the frame 102 are collectively referred to as an integral assembly for ease of description.

In addition, turning back to FIG. 2, in some embodiments, the battery 10 comprises both the integral assembly and an outer case 107. The outer case 107 generally comprises a case body and a case cover 108, where the case cover 108 covers an end opening of the case body to form a closed space for accommodating the integral assembly. The integral assembly is arranged in the outer case 107. In some embodiments, at least two integral assemblies are provided in the outer case 107, different integral assemblies are electrically connected by means of the high-voltage lead-out members 105 and connecting busbar components. Specifically, the high-voltage lead-out member 105 of one of the integral assembly is electrically connected to the high-voltage lead-out member 105 of another integral assembly by means of the connecting busbar component, such that electrical connection between the different integral assemblies in the outer case 107 is achieved, and leading out of electrical energy is facilitated. By way of example, the high-voltage lead-out member 105 is connected to the connecting busbar component by means of the fastener 106, on the one hand, the fastener 106 locks the high-voltage lead-out member 105, the connecting busbar component and the base 103 together, on the other hand, implement the electrical connection between the high-voltage lead-out member 105 and the connecting busbar component.

Next, the structure of the protective cover 104 will be described.

FIGS. 9-36 illustrates the structure of the protective cover 104 according to some embodiments of the present application.

Referring to FIGS. 9-36, in the embodiment of the present application, the protective cover 104 comprises a first cover 1, a second cover 2, and a cover closing mechanism or structure 3. The first cover 1 is configured to be fixed to the frame 102 of the battery 10. The first cover 1 is provided with an accommodating cavity 14, and the accommodating cavity 14 is configured for accommodating the high-voltage lead-out member 105. The accommodating cavity 14 has an opening 15, the opening 15 being configured for exposing the high-voltage lead-out member 105. The second cover 2 is rotatably arranged on the first cover 1, and correspondingly opens and respectively closes the opening 15 when rotated relative to the first cover 1 in a first direction of rotation and a second direction of rotation. The cover closing mechanism 3 is connected to the first cover 1 and the second cover 2, and causes the second cover 2 to rotate in the second direction of rotation after the second cover 2 is opened and the external force for opening the second cover 2 is removed.

Figure 9:
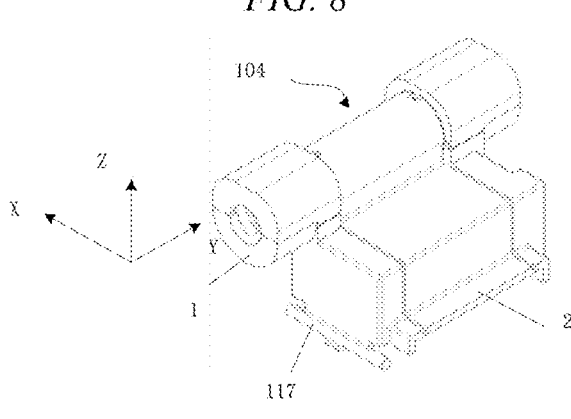
FIG. 9 is a schematic perspective view of the protective
cover in the closed state according to the first embodiment
of the present application.

The first direction of rotation is an opening direction of the second cover 2, and when the second cover 2 is rotated in the first direction of rotation, the opening 15 is gradually opened to expose the high-voltage lead-out member 105, facilitating the dismounting or mounting of the high-voltage lead-out member 105. In FIG. 9, the first direction of rotation is specifically a counterclockwise direction. The second direction of rotation is a closing direction of the second cover 2, and when the second cover 2 is rotated in the second direction of rotation, the opening 15 is gradually closed to cover the high-voltage lead-out member 105, reducing the risk of an electric shock accident caused by accidentally touching the high-voltage lead-out member 105. In FIG. 9, the second direction of rotation is specifically a clockwise direction.

On the basis of the above-described arrangement, the protective cover 104 has an automatic cover closing function. After the external force for opening the second cover 2 is eliminated, the second cover 2 can be automatically rotated in the second direction of rotation for closing the opening 15 under the action of the cover closing mechanism 3, such that the second cover 2 can be automatically rotated toward a closed position under the action of the cover closing mechanism 3 even if an operator forgets to re-rotate the second cover 2 to the closed position after opening the second cover 2 to complete the dismounting or mounting of the high-voltage lead-out member 105. Thus, it is possible to reduce the risk of forgetting to close the second cover 2 and to prevent the safety issue caused by forgetting to close the second cover 2, and it is conducive to the improving the use safety.

Figure 11:
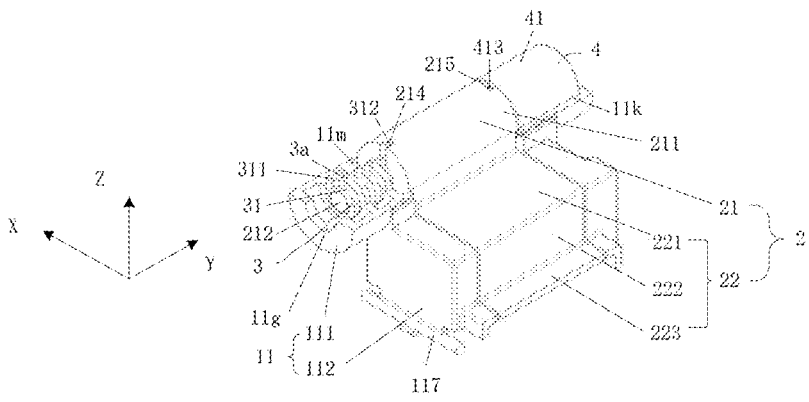
FIG. 11 is a schematic perspective view of the protective
cover in the closed state according to the first embodiment
of the present application, with a first cover cap and a second
cover cap removed.
Figures 26, 27, 28, 29:
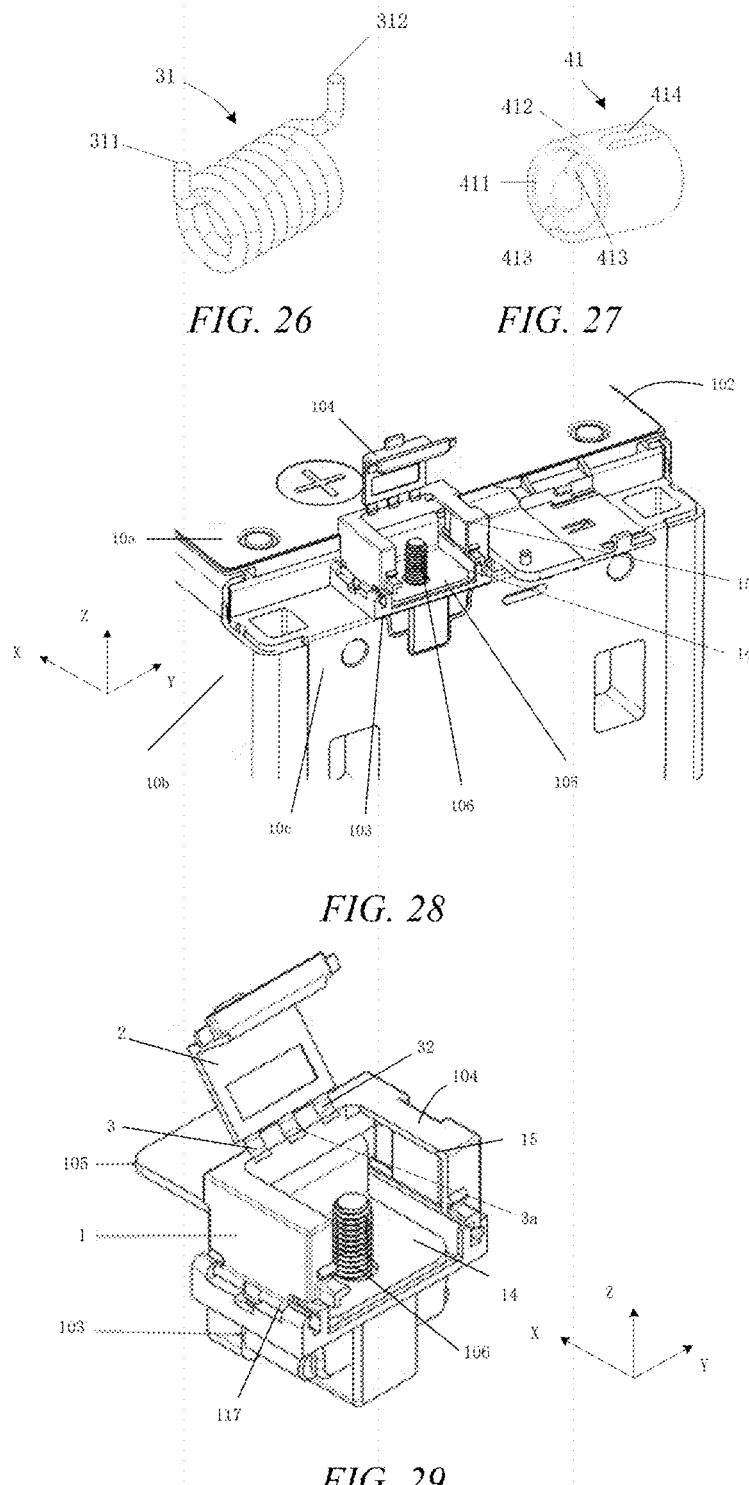
FIG. 26 is a schematic perspective view of the spring
according to the first embodiment of the present application.
FIG. 27 is a schematic perspective view of the damper
according to the first embodiment of the present application.
FIG. 28 is a schematic partial structural diagram of a
battery according to a second embodiment of the present
application.
FIG. 29 is a schematic diagram of a protective cover
mounted on a base in an opened state according to the
second embodiment of the present application.

As an example of the cover closing mechanism 3, referring to FIGS. 11 and 29, the cover closing mechanism 3 comprises an elastic member or structure 3a, where the elastic member 3a is connected to the first cover 1 and the second cover 2, and an elastic restoring force of the elastic member 3a drives the second cover 2 to rotate in the second direction of rotation after the external force for opening the second cover 2 is removed.

In the above-described arrangement, the elastic member 3a is connected to the first cover 1 and the second cover 2, such that when the operator applies an external force to rotate the second cover 2 relative to the first cover 1 in the first direction of rotation, the elastic member 3a elastically deforms to accumulate an elastic force. After the operator removes the external force for opening the second cover 2, the elastic force accumulated in the elastic member 3a is released, and the released elastic force can drive the second cover 2 to rotate in the second direction of rotation, such that the second cover 2 automatically returns.

It can be seen that the elastic member 3a provided can drive the second cover 2 to return automatically, thereby preventing the safety risk caused by the operator forgetting to close the second cover 2.

In addition, the automatic cover closing function of the cover closing mechanism 3 is achieved by using the elastic member 3a without providing a complicated transmission mechanism as in other mechanical structures for achieving the automatic closing function. Therefore, the structure is simple, and the cost is low. Since the protective cover 104 itself has a small size and space available for mounting the protective cover 104 is limited, it is particularly suitable to drive the second cover 2 to close automatically using the elastic member 3a having a simple structure.

The elastic member 3a is a member having elasticity, which may vary in its specific structural form. As an example, the elastic member 3a comprises a spring 31 or connecting pieces 32. FIGS. 9-27 and FIGS. 28-36 illustrate the structures of the protective cover 104 in which the elastic member 3a comprises the spring 31 and the elastic member 3a comprises the connecting pieces 32, respectively. Descriptions will be provided separately in the following.

The protective cover 104 in which the elastic member 3a comprises the spring 31 is first described with reference with FIGS. 9 to 27.

Referring to FIGS. 9-27, in some embodiments, the elastic member 3a comprises the spring 31, with a first end 311 of the spring 31 being connected to the first cover 1 and a second end 312 of the spring 31 being connected to the second cover 2, such that the second cover 2 is rotated in the second direction of rotation under the drive of the elastic restoring force of the spring 31 after the external force for opening the second cover 2 is removed. On the basis of the above-described arrangement, the spring 31 comprises two ends, where the first end 311 of the spring 31 is fixed relative to the first cover 1, and the second end of the spring 31 is rotatable relative to the first cover 1 with the second cover 2. As the second cover 2 is rotated relative to the first cover 1 in the first direction of rotation, the spring 31 may be twisted to generate an accumulated force and has an elastic restoring force. Once the external force for opening the second cover 2 is eliminated later, the elastic restoring force of the spring 31 is released, and the second cover 2 can be driven to rotate in the second direction of rotation, such that the second cover 2 can automatically return to achieve the automatic cover closing function. In addition, an elastic coefficient, length, etc. of the spring 31 may be set according to a driving force required to drive the second cover 2 to rotate.

Since the corresponding automatic cover closing function can be achieved only by connecting the two ends of the spring 31 to the first cover 1 and the second cover 2 respectively, the structure is simple.

Moreover, since the elastic restoring force of the spring 31 is strong, the second cover 2 can be driven to fully return to the closed position, completely covering and protecting the high-voltage lead-out member 105. Therefore, when the spring 31 is used as the cover closing mechanism 3, fully automatic closing of the second cover 2 can be achieved, and no manual intervention is required throughout the closing process, such that time and effort are saved on.

Meanwhile, in the case where the automatic cover closing function is achieved by using the spring 31, as the second cover 2 returns to the closed position under the action of the spring 31, the spring 31 can still provide a certain resilience force such that the second cover 2 can be stably maintained in the closed position without additionally providing a special connection structure for fixing a free end of the second cover 2 and the first cover 1. That is to say, the provision of the spring 31 makes it possible to stably maintain the second cover 2 in the closed position on the basis of the simpler structure, reducing the risk of accidental opening. It will be understood that the free end of the second cover 2 refers to the end of the second cover 2 that is not connected to the first cover 1 in an opened state.

It can be seen that the provision of the spring 31 makes it possible to achieve the fully automatic closing process and automatic maintenance of a closed state after the cover is closed on the basis of the simple structure, which is conducive to further improving the use safety.

The two ends of the spring 31 may be connected to the first cover 1 and the second cover 2 in various ways.

As an example, the first end 311 of the spring 31 is engaged with the first cover 1. For example, referring to FIG. 15, in some embodiments, an insertion opening 11a is formed in the first cover 1, and the first end 311 of the spring 31 is inserted into the insertion opening 11a to implement the engagement between the first end 311 of the spring 31 and the first cover 1. When the first end 311 of the spring 31 is connected to the first cover 1 by means of engagement, the structure is simple and the assembly is easy, and the first end 311 of the spring 31 can be kept stationary relative to the first cover 1 and may not be rotated with the second cover 2, thus facilitating a relative rotation between the first end and the second end 312 of the spring 31, such that the spring 31 can torsionally deforms to accumulate an elastic force as the second cover 2 is rotated in the first direction of rotation.

By way of example, the second end 312 of the spring 31 is engaged with the second cover 2. For example, referring to FIG. 11, in some embodiments, a first engaging groove 214 is provided in the second cover 2, and the second end 312 of the spring 31 is engaged in the first engaging groove 214, so as to implement the engagement between the second end 312 of the spring 31 and the second cover 2. When the second end 312 of the spring 31 and the second cover 2 are connected in an engagement manner, the structure is simple and the assembly is convenient, and the second end 312 of the spring 31 can be rotated together with the second cover 2, thus facilitating a relative rotation between the second end 312 of the spring 31 and the first end 311 of the spring 31, such that the spring 31 can torsionally deform to accumulate an elastic force as the second cover 2 is rotated in the first direction of rotation.

Figure 10:
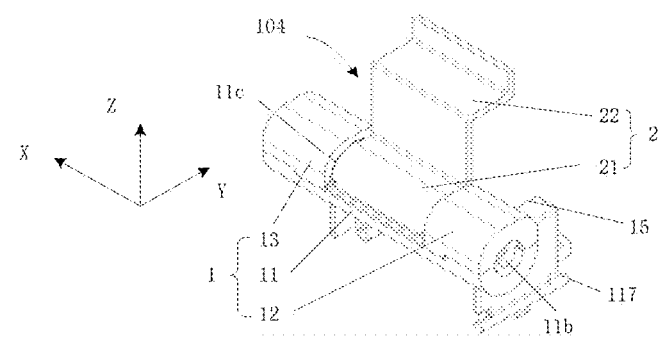
FIG. 10 is a schematic perspective view of the protective
cover in the opened state according to the first embodiment
of the present application.

In addition, in order to implement more reliable mounting of the spring 31, referring to FIG. 10 in combination with FIG. 11, in some embodiments, the first cover 1 is provided with a first limiting cavity 11b, and the spring 31 is arranged in the first limiting cavity 11b. On this basis, since the first limiting cavity 11b may limit the spring 31 to a certain extent, the reliability of arrangement of the spring 31 on the first cover 1 may be improved, which is conducive to fully and reliably achieving the automatic resilient function of the spring 31.

As an implementation of the first limiting cavity 11b, referring to FIG. 10 in combination with FIG. 11, in some embodiments, the first cover 1 comprises a base 11 and a first cover cap 12. A first groove 11g is provided in the base 11, and the first cover cap 12 is removably connected to the base 11 and covers the first groove 11g to form the first limiting cavity 11b.

In the above-described arrangement, the first limiting cavity 11b is formed by the first cover cap 12 covering over the base 11, such that the spring 31 may be effectively limited. Furthermore, the first cover cap 12 is removably connected to the base 11 to facilitate the dismounting or mounting of components such as the spring 31 located in the first limiting cavity 11b. When it is required to remove or mount the components such as the spring 31 located in the first limiting cavity 11b, the first cover cap 12 can be dismounted from the base 11 to uncover the space above the first groove 11g, and in this case, the components such as the spring 31 located in the first limiting cavity 11b can be easily mounted or dismounted, and the efficiency is high. After the dismounting is completed, the first cover cap 12 can be mounted on the base 11 again, and the limiting can be performed again.

In order to removably connect the first cover cap 12 to the base 11, referring to FIGS. 16-24, in some embodiments, the first cover cap 12 is engaged with the base 11. Specifically, as shown in FIGS. 16-24, in some embodiments, a groove 11e is provided in the base 11, a connecting rib 11f is provided on the first cover cap 12, a convex rib 11h is provided on the connecting rib 11f, and the connecting rib 11f is engaged into the groove 11e and is in interference fit with the groove 11e by means of the convex rib 11h to prevent the connecting rib 11f from sliding out of the groove 11e.

In the above-described arrangement, on the basis of the fit between the connecting rib 11f, the convex rib 11h and the groove 11e, on the one hand, the first cover cap 12 is engaged with the base 11 such that the removable connection between the first cover cap 12 and the base 11 can be easily implemented, and the dismounting or mounting of the components such as the spring 31 located in the first limiting cavity 11b can be then facilitated; on the other hand, after the connecting rib 11f and the convex rib 11h are engaged into the groove 11e, due to the interference fit between the convex rib 11h and the groove 11e, the connection is reliable, and slipping off is less likely to occur, which is conducive to implementing the robust mounting of the first cover cap 12 on the base 11 and facilitates the reliable limiting of the spring 31, etc. by the first cover cap 12.

Figure 25:
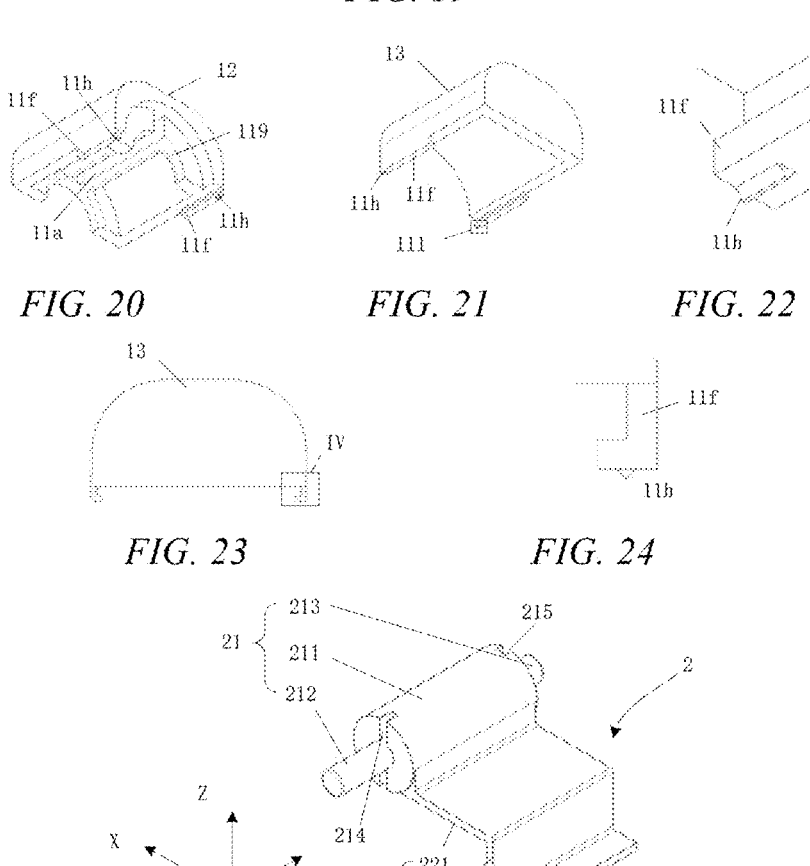
FIG. 25 is a schematic perspective view of the second
cover according to the first embodiment of the present
application.

As a structural form of the second cover 2, referring to FIG. 25 in combination with FIG. 10, in some embodiments, the second cover 2 comprises a rotating shaft 21 and a cover body 22, where the rotating shaft 21 is rotatably arranged on the first cover 1, the cover body 22 is connected to the rotating shaft 21 for opening or closing the opening 15, and the second end 312 of the spring 31 can be connected to the rotating shaft 21. With this arrangement, the connection between the second end 312 of the spring 31 and the second cover 2 can be implemented, and it is facilitated that the second end 312 of the spring 31 is rotated together with the second cover 2 as the second cover 2 is rotated.

As an example, referring to FIG. 25 in combination with FIG. 11, the rotating shaft 21 comprises a first shaft body 211 and a second shaft body 212. The first shaft body 211 is connected to the cover body 22, the second shaft body 212 is connected to a first axial end of the first shaft body 211, the spring 31 is sleeved on the second shaft body 212, and the second end 312 of the spring 31 is connected to the first shaft body 211. In this case, the second end 312 of the spring 31 is connected to the rotating shaft 21 and then connected to the second cover 2 by being connected to the first shaft body 211 such that the second end 312 of the spring 31 can be rotated together with the second cover 2. Meanwhile, since the second shaft body 212 supports the spring 31, the spring 31 has a good structural stability and can be more reliably rotated together with the second cover 2, which is conducive for the spring 31 to fully implement an automatic resilient function for the second cover 2.

Next, the protective cover 104 in which the elastic member 3a comprises the connecting pieces 32 will be described with reference to FIGS. 28-36.

Referring to FIGS. 28-36, in some embodiments, the elastic member 3a comprises the connecting pieces 32, and the second cover 2 is rotatably connected to the first cover 1 by means of the connecting pieces 32 such that an elastic restoring forces of the connecting pieces 32 drive the second cover 2 to rotate in the second direction of rotation after the external force for opening the second cover 2 is removed.

In the above-described arrangement, the connecting pieces 32 form a thin-walled hinge structure. The connecting pieces 32 may be formed integrally with the first cover 1 and/or the second cover 2, and specifically, part of material may be cut off at a connection part between the first cover 1 and the second cover 2, and the thickness of the connection part may be further reduced to form one or more connecting piece structures 32 spaced apart from each other. The connecting pieces 32 may also be connecting piece structures fixed between the first cover 1 and the second cover 2, and may be made of the same material as or different from the first cover 1 and/or the second cover 2. The connecting pieces 32 are used not only for implementing the rotational connection of the first cover 1 and the second cover 2, but also for driving the second cover 2 to return automatically, in order to avoid the risk of electric shock due to the operator forgetting to close the second cover 2.

As an example, in order to achieve the functions such as connection and return, the performance of the connecting pieces 32 needs to meet at least one of:

the thickness of the connecting piece 32 being less than or equal to 0.7 mm;

the tensile strength of the material of the connecting piece 32 being between 20 and 50 MPa;

the elongation at break of the material of the connecting piece 32 being less than or equal to 15%;

the bending strength of the material of the connecting piece 32 being between 30 and 80 MPa;

the Charpy notched impact strength of the material of the connecting piece 32 being less than or equal to 35 KJ/m$^2$; and the width of the connecting piece 32 being greater than or equal to 3 mm.

The connecting pieces 32 meeting at least one of the above-described conditions has a good toughness and can generate a good recoverable deformation, which is conducive to reliably driving the second cover 2 to automatically return; and the connecting pieces also has an appropriate hardness, is easy to bend and is less like to undergo brittle fractures, which is conducive to implementing repeated opening and closing. The thickness of each of the connecting pieces 32 refers to a distance dimension between two surfaces of the connecting piece 32 facing and away from the opening 15 (i.e. an inner surface and an outer surface of the connecting piece 32). The width of the connecting piece 32 refers to a dimension of the connecting piece 32 in the third direction Z.

In order for the material of the connecting piece 32 to meet all of the above requirements for material, in some embodiments, the connecting piece 32 is made of a nylon material such as PA6. PA6 (Polyamide 6), also referred to as nylon 6, is a kind of nylon material and is a high molecular compound. PA6 has a tensile strength greater than or equal to 45 MPa and less than or equal to 50 MPa, an elongation at break greater than or equal to 3% and less than or equal to 15%, a bending strength greater than or equal to 65 MPa and less than or equal to 80 MPa, and a Charpy notched impact strength greater than or equal to 5 $KJ/m^2$ and less than or equal to 35 $KJ/m^2$. The connecting pieces 32 made of the PA6 have appropriate tensile strength, bending strength, elongation at break and impact strength, and is not too soft or too hard, such that the connecting pieces 32 can be repeatedly bent and is less like to undergo brittle fracture.

In the cover closing mechanism 3, one, two or more connecting pieces 32 may be provided. Referring to FIGS. 28-33, in some embodiments, the cover closing mechanism 3 comprises at least two connecting pieces 32, where the at least two connecting pieces 32 are spaced apart in an extension direction of an axis of rotation of the second cover 2. Thus, on the one hand, the connection between the second cover 2 and the first cover 1 is more robust and reliable, on the other hand, each connecting piece 32 can apply a resilience force to the second cover 2, which is conducive to reliably driving the second cover 2 to be automatically closed.

As a further improvement of the foregoing embodiments, referring to FIG. 11, in some embodiments, the protective cover 104 comprises a speed reducer 4, where the speed reducer 4 is connected to the first cover 1 and the second cover 2, and applies, when the cover closing mechanism 3 causes the second cover 2 to rotate in the second rotational direction, an acting force to the second cover 2 in the first rotational direction to reduce a closing speed of the second cover 2.

Due to the fact that the provided speed reducer 4 can slow down the closing speed of the second cover 2, by means of the cooperation of the cover closing mechanism 3 and the speed reducer 4, the second cover 2 can be rotationally closed slowly when the operator rotates and opens the second cover 2 and the external force is eliminated. This may provide sufficient time for the dismounting or mounting of the high-voltage lead-out member 105, which facilitates the operator removing or mounting the high-voltage lead-out member 105, i.e, removal of the external force for opening the second cover 2, and the second cover 2 is automatically and slowly closed rotationally at a certain speed while the high-voltage lead-out member 105 is dismounted or mounted. In this case, since the automatic closing of the second cover 2 may be synchronized with the dismounting or mounting of the high-voltage lead-out member 105 without additional time, it is conducive to improving the efficiency of dismounting, mounting and maintenance. Also, since the second cover 2 is not closed too quickly, it is less likely to pinch the operator who is performing the dismounting, mounting or maintenance, the safety is further improved. In addition, since the acting force on the second cover 2 may be eliminated after the operator opens the second cover 2, the operator does not need to hold the second cover 2. Therefore, the operator's hand for rotating the second cover 2 is freed, and can directly perform the dismounting or mounting of the high-voltage lead-out member 105, so it is beneficial to reduce the number of persons required throughout the dismounting, mounting and maintenance, and it is easy for a single person to complete the whole dismounting, mounting and maintenance process.

It can be seen that by additionally providing the speed reducer 4 on the basis of the cover closing mechanism 3, it is conducive to further improving the safety performance of the battery 10 and to improving the efficiency of dismounting, mounting and maintenance of the battery 10.

Since the spring 31 is generally more likely to cause the second cover 2 to be closed quickly than the connecting piece 32, the speed reducer 4 is particularly suitable for an embodiment in which the cover closing mechanism 3 comprises the spring 31. Referring to FIG. 11, in the embodiment in which the cover closing mechanism 3 comprises the spring 31 and the protective cover 104 comprises the speed reducer 4, as an example, the speed reducer 4 and the spring 31 of the cover closing mechanism 3 are arranged on two opposite sides of the second cover 2, such that it is more advantageous for the speed reducer 4 and the spring 31 to apply rotational acting forces in opposite directions to the second cover 2 when the second cover 2 is rotated, the layout is more rational, and the overall structure is more simple and compact.

As an implementation of the speed reducer 4, referring to FIG. 11 in combination with FIG. 27, the speed reducer 4 comprises a damper 41. Specifically, as shown in FIG. 27, the damper 41 is a rotary damper, and comprises an inner damper 411 and an outer damper 412, the outer damper 412 being sleeved on the inner damper 411, and a viscous fluid being provided therebetween so as to achieve a damping effect and slow down a rotation speed. In this case, the damper 41 may be connected to the second cover 2 by means of the inner damper 411, such that when the second cover 2 is automatically rotationally closed under the drive of the cover closing mechanism 3, the inner damper 411 may rotate therewith, to rotate relative to the outer damper 412, and since the viscous fluid between the inner damper 411 and the outer damper 412 may apply a resistance to the inner damper 411 when the inner damper 411 rotates relative to the outer damper 412, the rotation speed of the second cover 2 can be reduced, and the second cover 2 is controlled to be slowly closed.

In each of the above-described embodiments, the speed reducer 4 may be connected to the first cover 1 and the second cover 2 in various ways.

As an example, the speed reducer 4 is in engaged with the first cover 1, resulting in a more simple structure and easier assembly. For example, referring to FIG. 14 in combination with FIG. 19 and FIG. 27, in some embodiments, a boss 414 is provided on the speed reducer 4, an engaging opening 11*d* is provided on the first cover 1, and the boss 414 is engaged into the engaging opening 11*d* so as to implement the engagement between the speed reducer 4 and the first cover 1. Specifically, when the speed reducer 4 comprises the damper 41, the boss 414 is provided on the outer damper 412 of the damper 41 such that the outer damper 412 is engaged with the first cover 1, which in turn implements the engagement between the damper 41 and the first cover 1. Therefore, when the second cover 2 is rotated relative to the first cover 1, the outer damper 412 is fixed relatively to the first cover 1 and does not rotate with the second cover 2, and thus rotates relative to the inner damper 411, so as to facilitate a damping effect of the damper 41 and to reduce the closing speed of the second cover 2.

As an example, the speed reducer 4 is in engaged with the second cover 2, resulting in a more simple structure and easier assembly. For example, referring to FIG. 11 in combination with FIGS. 25 and 27, in some embodiments, an engaging block 413 is provided on the speed reducer 4, a second engaging groove 215 is provided in the second cover 2, and the engaging block 413 is engaged with the second engaging groove 215 so as to implement the engagement between the speed reducer 4 and the second cover 2. Specifically, when the speed reducer 4 comprises the damper 41, the engaging block 413 is provided on the inner damper 411 of the damper 41 such that the inner damper 411 is engaged with the second cover 2, thus achieving the engagement between the damper 41 and the second cover 2. Therefore, when the second cover 2 is rotated relative to the first cover 1, the inner damper 411 can rotate together with the second cover 2, and thus generates a rotation relative to the outer damper 412, which is convenient to achieve a damping effect of the damper 41 and to reduce the closing speed of the second cover 2.

In addition, in order to implement reliable mounting of the speed reducer 4, referring to FIG. 10 in combination with FIG. 11, in some embodiments, the first cover 1 is provided with a second limiting cavity 11c, and the speed reducer 4 is arranged in the second limiting cavity 11c. On this basis, since the second limiting cavity 11c can limit the speed reducer 4 to a certain extent, it is possible to improve the reliability of arrangement of the speed reducer 4 on the first cover 1, which is conducive for the speed reducer 4 to fully and reliably implement a speed reduction function.

As an implementation of the second limiting cavity 11c, referring to FIG. 10 in combination with FIG. 11, in some embodiments, the first cover 1 comprises the base 11 and the second cover cap 13, where a second groove 11k is provided in the base 11, and the second cover cap 13 is removably connected to the base 11 and covers the second groove 11k to form the second limiting cavity 11c.

In the above-described arrangement, the second limiting cavity 11c is formed by the second cover cap 13 covering over the base 11, and can effectively limit the speed reducer 4. In addition, the second cover cap 13 is removably connected to the base 11 to facilitate dismounting or mounting of components such as the speed reducer 4 located in the second limiting cavity 11c. When it is required to dismount or mount the components such as the speed reducer 4 located in the second limiting cavity 11c, the second cover cap 13 can be dismounted from the base 11 such that the space above the second groove 11k is uncovered, and in this case, the components such as the speed reducer 4 located in the second limiting cavity 11c can be easily mounted or dismounted, and the efficiency is high. When the dismounting or mounting is completed, the second cover cap 13 can be mounted on the base 11 again, and the limiting can be performed again.

In order to removably connect the second cover cap 13 to the base 11, referring to FIGS. 16-24, in some embodiments, the second cover cap 13 is engaged with the base 11. Specifically, as shown in FIGS. 16-24, in some embodiments, a groove 11e is provided in the base 11, a connecting rib 11f is provided on the second cover cap 13, a convex rib 11h is provided on the connecting rib 11f, and the connecting rib 11f is engaged into the groove 11e and is in interference fit with the groove 11e by means of the convex rib 11h so as to prevent the connecting rib 11f from sliding out of the groove 11e.

In the above-described arrangement, on the basis of the fit between the connecting rib 11f, the convex rib 11h and the groove 11e, on one hand, the second cover cap 13 is engaged with the base 11 such that the removable connection between the second cover cap 13 and the base 11 can be easily implemented, and the dismounting or mounting of the components such as the speed reducer 4 located in the second limiting cavity 11c can be then facilitated; on the other hand, after the connecting rib 11f and the convex rib 11h are engaged into the groove 11e, due to the interference fit between the convex rib 11h and the groove 11e, the connection is reliable, and slipping off is less likely to occur, which is conducive to implementing the robust mounting of the second cover cap 13 on the base 11 and facilitates the reliable limiting of the speed reducer 4, etc. by the second cover cap 13.

In each of the foregoing embodiments, the free end of the second cover 2 can be connected to the first cover 1 by means of a snap-fit structure 6 or a magnetic attraction structure 7. In this way, the connection between the free end of the second cover 2 and the first cover 1 is more robust, and after the second cover 2 returns to the closed position under the action of the cover closing mechanism 3, the second cover 2 can be more stably maintained in the closed position to sufficiently cover the high-voltage lead-out member 105, effectively reducing the risk of electric shock.

The arrangement described above is particular suitable for the case of the cover closing mechanism 3 comprising the above-described connecting pieces 32. In comparison with the spring 31, the resilience force that can be applied by the connecting pieces 32 is relatively small, therefore, there may be a problem that the second cover 2 may not be completely automatically closed in place or the second cover 2 may not be stably maintained in the closed position by means of the connecting pieces 32 themselves, and a corresponding problem is more likely to occur with multiple times of opening and closing the second cover 2. As a result, in the case where the cover closing mechanism 3 comprises the foregoing connecting pieces 32, the corresponding problem can be effectively solved by further providing the snap-fit structure 6 or the magnetic attraction structure 7 to further restrict the free end of the second cover 2, allowing the second cover 2 to be fully closed and stably maintained in the closed position. Although compared with the case where the second cover 2 is completely opened, a certain covering effect can still be provide on the high-voltage lead-out member 105 even if the second cover 2 is partially closed, the risk of electric shock can be reduced and the use safety can thus be improved, it is possible to more effectively reduce the risk of electric shock and improve the use safety by providing the snap-fit structure 6 or the magnetic attraction structure 7 to further restrict the free end of the second cover 2.

Figure 12:
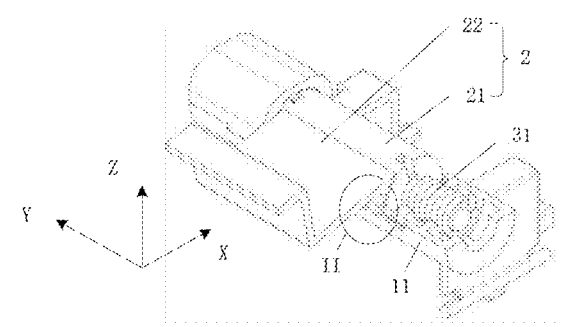
FIG. 12 is a schematic perspective view of the protective
cover opened at a maximum angle according to the first
embodiment of the present application, with the first cover
cap and the second cover cap removed.
Figure 13:
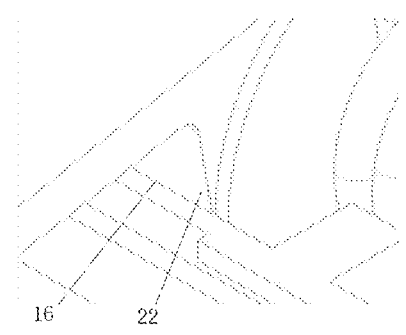
FIG. 13 is a schematic enlarged view of part II of FIG. 12.

Moreover, referring to FIGS. 12 and 13, in each of the foregoing embodiments, the first cover 1 may have a limiting portion 16, and the limiting portion 16 limits the maximum opening angle of the second cover 2 by means of its contact with the second cover 2. Thus, on one hand, it is possible to prevent the opening angle of the second cover 2 from being excessively large and prevent the second cover 2 from interfering with other components. On the other hand, an opening operation by the operator can be facilitated, and the operator only rotates the second cover 2 in the first direction of rotation until the second cover 2 abuts against the limiting portion 16 and the second cover 2 cannot be rotated any more. Furthermore, it is easy to adjust the maximum opening angle of the second cover 2 by adjusting the position and/or the structure of the limiting portion 16, so as to achieve customizable adjustment of the maximum opening angle of the second cover 2 to flexibly adapt to different usage requirements. As an example, referring to FIG. 12, the limiting portion 16 limits the maximum opening angle of the second cover 2 to be equal to or greater than 180°. In this case, the maximum opening angle of the second cover 2 is large, such that the high-voltage lead-out member 105 can be sufficiently exposed to provide a spacious operating space for the operator, facilitating the operation by the operator, and improving the efficiency of dismounting, mounting and maintenance by the operator.

Figure 2:
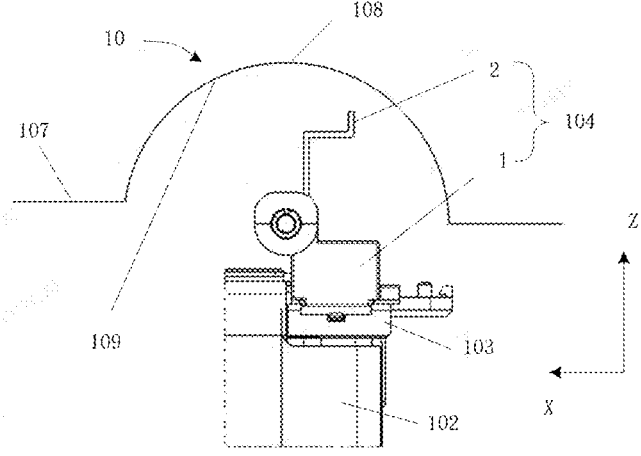
FIG. 2 is a schematic partial structural diagram of a
battery according to a first embodiment of the present
application.

Referring back to FIG. 2, in some embodiments, an inner wall of the case cover 108 of the battery 10 is provided with a receding groove 109, and the receding groove 109 avoids the second cover 2 to prevent the second cover 2 from interfering with the case cover 108 during rotation, such that the opening and closing smoothness of the second cover 2 can be further ensured. As an example, as shown in FIG. 2, the receding groove 109 is arc-shaped and is recessed upward. When the second cover 2 is rotated at an angle of 90°, the highest point of the second cover 2 is lower than the receding groove 109 without interfering with the case cover 108.

Figures 30, 31, 32:
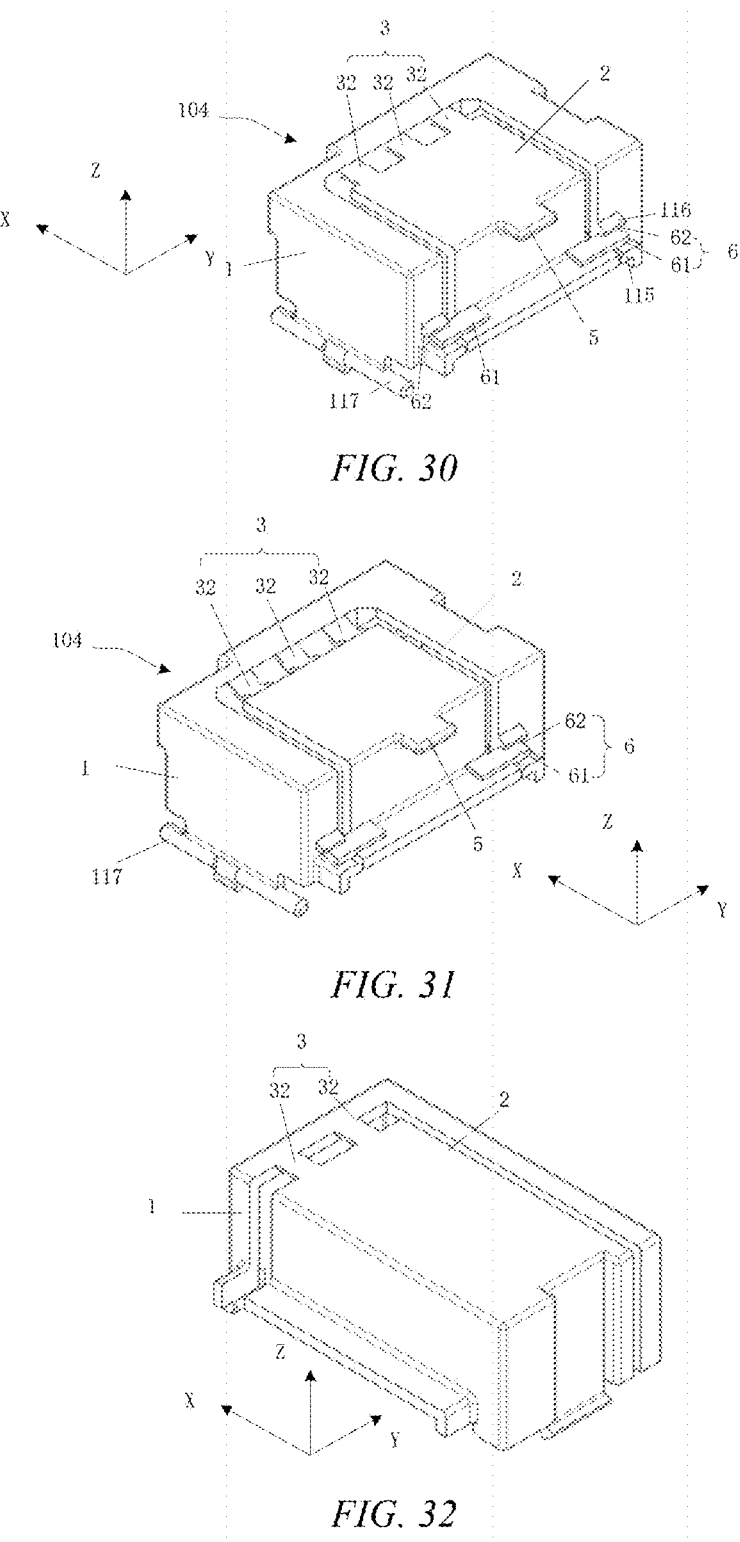
FIG. 30 is a schematic perspective view of the protective
cover in a closed state according to the second embodiment
of the present application.
FIG. 31 is a schematic perspective view of a protective
cover in a closed state according to a third embodiment of
the present application.
FIG. 32 is a schematic perspective view of a protective
cover in a closed state according to a fourth embodiment of
the present application.

As a further improvement of each of the foregoing embodiments, referring to FIG. 30, the second cover 2 is provided with a grip portion 5. In this way, when opening or closing the second cover 2, the operator can grasp the grip portion 5 and rotate the second cover 2, such that the operator can easily exert a force.

The embodiments of FIGS. 2-36 will be further described below.

The first embodiment shown in FIGS. 2-27 will first be further described.

As shown in FIGS. 2-8, in this embodiment, the protective cover 104 is an insulating member that covers the high-voltage lead-out member 105 and is removably connected to the base 103. As shown in FIG. 5, the base 103 is provided on the end plate 10c of the frame 102, and is connected to the high-voltage lead-out member 105 by means of the fastener 106 such as the bolt. Also, as shown in FIG. 6, the protective cover 104 is rotatably connected to the base 103 by means of the connecting shaft 117. When required, the connecting shaft 117 is inserted into a shaft hole of the base 103 to mount the protective cover 104 on the base 103, and when not required, the connecting shaft 117 is removed from the shaft hole of the base 103 to dismount the protective cover 104. As shown in FIG. 8, the high-voltage lead-out member 105 has a substantially Z shape. A part of the high-voltage lead-out member 105 is located in the accommodating cavity 14 of the protective cover 104, is latched to the base 103 by the fastener 106, and is latched to a connecting busbar component by the fastener 106, so as to be electrically connected to the high-voltage lead-out member 105 of another integral assembly by means of the connecting busbar component. Meanwhile, another part of the high-voltage lead-out member 105 extends from the accommodating cavity 14 in the second direction X to be electrically connected to the battery cell 101 (shown in FIG. 4) of the integral assembly corresponding thereto.

The structure of the protective cover 104 is further shown in FIGS. 9-27.

As shown in FIGS. 9-15, in this embodiment, the protective cover 104 comprises the first cover 1, the second cover 2, the spring 31 serving as the cover closing mechanism 3, and the damper 41 serving as the speed reducer 4.

The first cover 1 is connected to the base 103 and provides a mounting basis for the second cover 2, the cover closing mechanism 3 and the speed reducer 4. FIGS. 16-24 show the structure of the first cover 1 in this embodiment.

As shown in FIGS. 16-24, in this embodiment, the first cover 1 comprises the base 11, the first cover 12 and the second cover 13. The first cover cap 12 and the second cover cap 13 are both connected to the base 11 and respectively enclose the first limiting cavity 11b and the second limiting cavity 11c together with the base 11, which are respectively used for accommodating the spring 31 and the damper 41.

Specifically, as shown in FIGS. 16-19, the base 11 comprises an accommodating portion 111 and a supporting portion 112. The accommodating cavity 14 for accommodating the high-voltage lead-out member 105 is located between the accommodating portion 111 and the supporting portion 112. It can be seen in combination with FIGS. 16 and 7 that the accommodating portion 111 is connected to the base 103 by means of the supporting portion 112. The first cover cap 12 and the second cover cap 13 are connected to the accommodating portion 111, and respectively enclose the first limiting cavity 11b and the second limiting cavity 11c together with the accommodating portion 111.

It can be seen from FIGS. 16-19 that the supporting portion 112 comprises a first supporting body 113 and a second supporting body 114, where the first supporting body 113 and the second supporting body 114 are arranged in a spaced manner in the third direction Y. The foregoing connecting shaft 117 is arranged on the first supporting body 113 such that the first cover 1 is rotatably connected to the base 103 by means of the first supporting body 113. The connecting shaft 117 and the first supporting body 113 form an integral structure, so it is not required to mount or dismount the connecting shaft 117 separately when the protective cover 104 is assembled or disassembled, and the operation is simple.

As shown in FIGS. 16-19, the accommodating portion 111 is connected to the first supporting body 113 and the second supporting body 114, and particularly to the tops of the ends of the first supporting body 113 and the second supporting body 114 in the third direction X. In this way, a space between the first supporting body 113, the second supporting body 114 and the accommodating portion 111 forms the accommodating cavity 14. The top of the accommodating cavity 14 is open, forming the opening 15. The opening 15 has a substantially Z shape. Also, it can be seen from FIGS. 18 and 19 that in this embodiment, the accommodating portion 111 is substantially semi-cylindrical, with an axis extending in the third direction Y, and is internally provided with the first groove 11g, a third groove 11m and the second groove 11k which are sequentially in communication in the third direction Y. In addition, a groove 11e is provided in each of outer walls of the accommodating portion 111 corresponding to the first groove 11g and the second groove 11m. The lengthwise direction of the groove 11e is in the third direction Y. The end of the groove 11e facing outward in the second direction X is open, and the end close to the third groove 11m in the third direction Y is also open.

Figure 14:
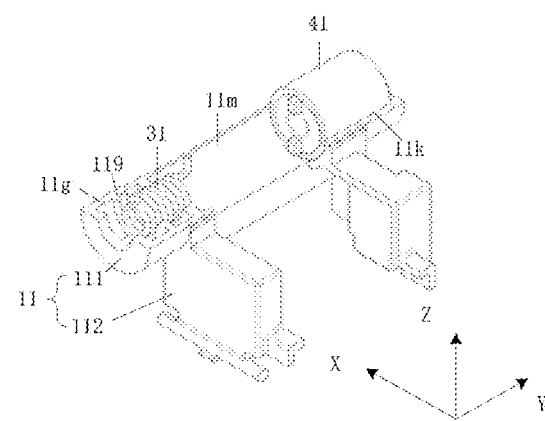
FIG. 14 is a schematic diagram of a spring and a damper
mounted on the base according to the first embodiment of
the present application.
Figure 15:
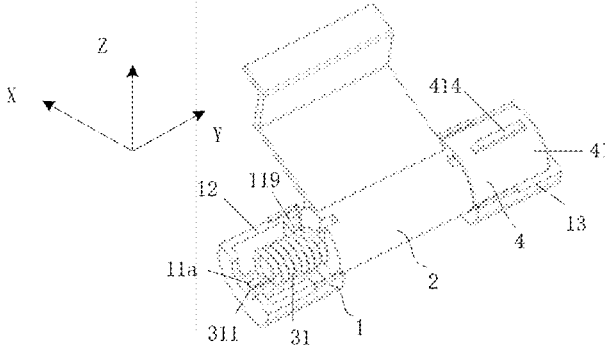
FIG. 15 is a schematic diagram of a combined structure of
the spring and the damper the first cover cap, the second
cover cap and the second cover according to the first
embodiment of the present application.
Figure 16:
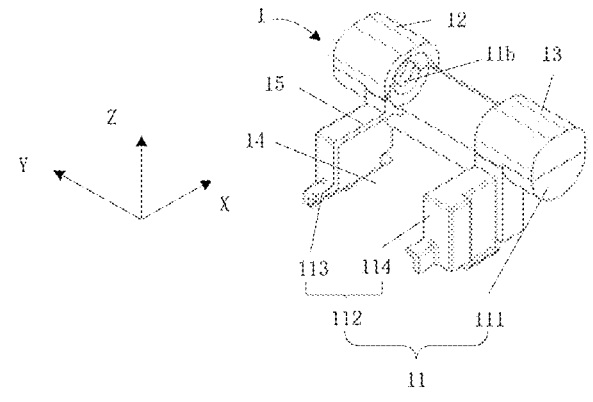
FIG. 16 is a first schematic perspective view of the first
cover according to the first embodiment of the present
application.
Figure 17:
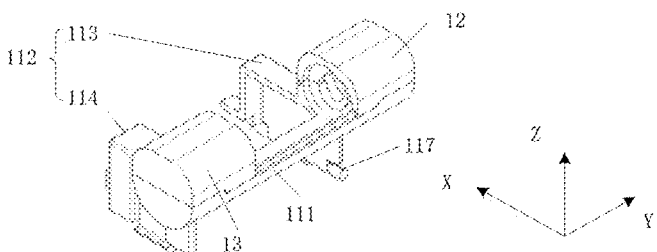
FIG. 17 is a second schematic perspective view of the first
cover according to the first embodiment of the present
application.
Figure 18:
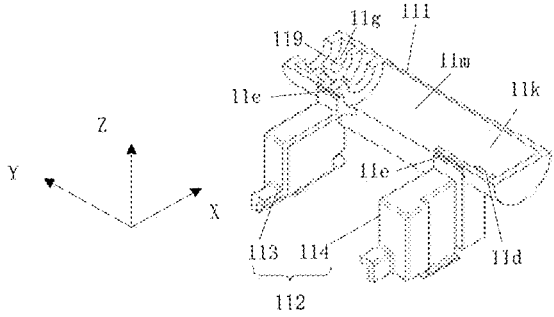
FIG. 18 is a first schematic perspective view of the base
according to the first embodiment of the present application.
Figure 19:
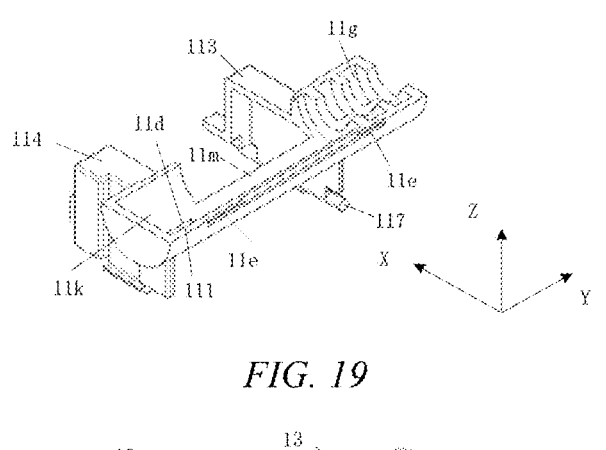
FIG. 19 is a second schematic perspective view of the
base according to the first embodiment of the present
application.

As shown in FIGS. 16, 17 and 20, the first cover cap 12 is substantially semi-cylindrical and covers over the first groove 11g to form the first limiting cavity 11b for accommodating the spring 31. It can be seen from FIG. 20 that the connecting rib 11$f$ is provided on the first cover cap 12, and the convex rib 11$h$ is provided on the connecting rib 11$f$. Also, it can be seen from FIGS. 22-24 that the connecting rib 11$f$ is substantially L-shaped; and the convex rib 11$h$ is substantially in the form of a triangular pyramid. The connecting rib 11$f$ and the convex rib 11$h$ are fitted in the grooves 11$e$ in the outer wall of the first groove 11$g$ to implement the engagement between the first cover cap 12 and the accommodating portion 111. When the first cover cap 12 is assembled to the accommodating portion 111, see FIG. 17-19, the connecting rib 11$f$ and the convex rib 11$h$ slide into the groove 11$e$ from the end of the groove 11$e$ that is open toward the third groove 11$m$, such that an L-shaped surface of the connecting rib 11$f$ is engaged with a side wall of the groove 11$e$, and the convex rib 11$h$ is in an interference fit with groove walls of the groove 11$e$. In this way, displacements of the first cover cap 12 in various directions can be effectively limited, the first cover cap 12 may be robustly mounted on the first cover 1, and the first cover cap 12 can also be easily dismounted from the first cover 1 to facilitate mounting, dismounting or replacement of the spring 31 in the first limiting cavity 11$b$. In addition, as shown in FIGS. 18-20, in this embodiment, arc-shaped ridges 119 are provided on an inner wall of the first cover cap 12 and an inner wall of the first groove 11$g$. Specifically, at least two arc-shaped ridges 119 are provided on the inner wall of the first groove 11$g$, and the at least two arc-shaped ribs 119 are arranged in a spaced manner in the third direction Y (which is also a direction of the axis of rotation of the second cover 2 and a direction of central axis of the spring 31), such that the arc-shaped ridges 119 arranged in the spaced manner along the central axis of the spring 31 are provided on the inner wall of the first limiting cavity 11$b$. An inner diameter of the arc-shaped ridges 119 is adapted to an outer diameter of the spring 31. The provision of the arc-shaped ridges 119 provides the advantage of facilitating the limiting on the spring 31. Referring to FIGS. 14 and 15, after being mounted in the first limiting cavity 11$b$, the spring 31 is located on the arc-shaped ridges 119, such that the spring 31 may be supported and limited by the arc-shaped ridges 119 and the spring 31 is prevented from deviation, which is conducive to good torsional deformation of the spring 31 during rotation of the second cover 2. And, compared with a way of directly increasing the overall wall thickness of the first limiting cavity 11$b$ in such a way that the inner diameter thereof is matched with an outer diameter of the spring 31, providing the arc-shaped ridges 119 provide a less increase in the overall weight, that is to say, providing the arc-shaped ridges 119 allows for effective limiting on the spring 31 without excessively increasing the weight.

As shown in FIGS. 16, 17 and 21-24, the second cover cap 13 is substantially semi-cylindrical and covers over the second groove 11$k$ to form the second limiting cavity 11$c$ for accommodating the damper 41. It can be seen from FIGS. 21-24 that the connecting rib 11$f$ is provided on the second cover cap 13, and the convex rib 11$h$ is provided on the connecting rib 11$f$. Also, the connecting rib 11$f$ is substantially L-shaped; and the convex rib 11$h$ is substantially in the form of a triangular pyramid. The connecting rib 11$f$ and the convex rib 11$h$ are fitted in the groove 11$e$ in the outer wall of the second groove 11$k$ to implement the engagement between the first cover cap 13 and the accommodating portion 111. When the second cover cap 13 is assembled to the accommodating portion 111, see FIG. 17, the connecting rib 11$f$ and the convex rib 11$h$ slide into the groove 11$e$ from the end of the groove 11$e$ that is open toward the third groove 11$m$, such that an L-shaped surface of the connecting rib 11$f$ is engaged with a side wall of the groove 11$e$, and the convex rib 11$h$ is in an interference fit with groove walls of the groove 11$e$. In this way, displacements of the second cover cap 13 in various directions can be effectively limited, and the second cover cap 13 may be robustly mounted on the first cover 1, and the second cover cap 13 can also be easily dismounted from the first cover 1 to facilitate mounting, dismounting or replacement of the damper 41 in the second limiting cavity 11$c$.

The second cover 2 is rotatably arranged on the first cover 1 for closing or opening the opening 15 so as to control exposure of the high-voltage lead-out member 105. FIG. 25 shows the structure of the second cover 2 in this embodiment. As shown in FIG. 25, in this embodiment, the second cover 2 comprises the rotating shaft 21 and the cover body 22. The cover body 22 is rotatably connected to the first cover 1 by means of the rotating shaft 21 and is configured for opening or closing the opening 15. The rotating shaft 21 comprises a first shaft body 211, a second shaft body 212, and a third shaft body 213. The second shaft body 212 and the third shaft body 213 are respectively connected to a first axial end and a second axial end of the first shaft body 211, and both the second shaft body 212 and the third shaft body 213 have diameters smaller than a diameter of the first shaft body 211. The cover body 22 is fixedly connected to the first shaft body 211, and comprises a first cover body 221, a second cover body 222, and a third cover body 223. The first cover body 221 is connected to the first shaft body 211. The second cover body 222 is connected between the first cover body 221 and the third cover body 223, and is bent relative to both the first cover body 221 and the third cover body 223 such that the entire cover body 22 has a substantially Z shape, which is consistent with the shape of the opening 15.

It can be seen in combination with FIGS. 11 and 10 that when the second cover 2 is mounted on the first cover 1, the first shaft body 211 is rotatably located in the third groove 11$m$, the second shaft body 212 extends into the first limiting cavity 11$b$ and is inserted into the spring 31, the third shaft body 213 extends into the second limiting cavity 11$c$ and is inserted into the damper 41, and meanwhile, the cover body 22 is adapted to the opening 15 for opening and closing the opening 15 when rotated in the first direction of rotation and the second direction of rotation respectively.

Also, as shown in FIGS. 12 and 13, in this embodiment, a top rim of the third groove 11$m$ away from the opening 15 forms a limiting portion 16 for limiting the maximum opening angle of the second cover 2. When the second cover 2 is opened at the maximum angle, the limiting portion 16 abuts against the cover body 22 to prevent the second cover 2 from continuing to be rotated. It can be seen from FIG. 12 that, in this embodiment, the maximum opening angle of the second cover 2 is greater than 180°, approximately 190°.

The spring 31 is configured to drive the second cover 2 to return automatically after the external force is eliminated. As shown in FIG. 26, the spring 31 has the first end 311 and the second end 312. As shown in FIGS. 10-15, and in combination with FIG. 25, it can be seen that the spring 31 is located in the first limiting cavity 11$b$ and sleeved on the second shaft body 212, such that the spring 31 may be limited jointly by the first limiting cavity 11$b$ and the second shaft body 212. Furthermore, the first end 311 and the second end 312 of the spring 31 are respectively engaged with the side wall of the first limiting cavity 11$b$ and the first shaft body 211. It can be seen from FIGS. 11 and 25 that the first axial end of the first shaft body 211 is provided with the first engaging groove 214, and the second end 312 of the spring 31 is engaged into the first engaging groove 214 so as to implement the engagement between the second end 312 of the spring 31 and the rotating shaft 21. Meanwhile, as shown in FIG. 15, the insertion opening 11*a* is provided in the inner wall of the first cover cap 12, and the first end 311 of the spring 31 is inserted into the insertion opening 11*a* to implement the engagement between the first end 311 of the spring 31 and the side wall of the first limiting cavity 11*b*. On this basis, the second end 312 of the spring 31 can be rotated together with the second cover 2 relative to the first cover 1 while the first end 311 of the spring 31 remains stationary relative to the first cover 1, and therefore, when the second cover 2 is rotated, the second end 312 of the spring 31 can be rotated relative to the first end 311 of the spring 31. In this way, during the operator rotating the second cover 2 in the first direction of rotation to open the second cover 2, the spring 31 is twisted to accumulate an elastic force; after the operator removes the rotation acting force applied to the second cover 2 in the first direction of rotation, the spring 31 in turn releases the accumulated elastic force to drive the second cover 2 to return automatically and to rotate in the second direction of rotation, until the second cover returns to the initial closed position to close the opening 15. Since the second cover 2 can automatically return under the action of the spring 31 to cover the high-voltage lead-out member 105, the safety risk caused by forgetting to close the second cover 2 can be avoided, and the use safety can be effectively improved. A cross section of a single turn of the spring 31 has a diameter of about 7 mm, and the number of turns is 2-5, such that the speed of automatic return is prevented from being excessively high, and a certain time can be provided for the dismounting or mounting of the high-pressure lead-out member 105.

The damper 41 is configured for controlling the automatic return speed of the second cover 2. FIG. 27 shows the structure of the damper 41. As shown in FIG. 27, in this embodiment, the damper 41 comprises the outer damper 412 and the inner damper 411 nested in the outer damper. The viscous fluid is provided between an inner ring of the outer damper 412 and an outer ring of the inner damper 411, and when the inner damper 411 rotates relative to the outer damper 412, the damping effect is achieved by hindering the rotation of the inner damper 411, thereby achieving the purpose of speed reduction. Two engaging blocks 413 are provided on the inner damper 411, and the two engaging blocks 413 are symmetrically arranged about the center of the inner damper 411. The boss 414 is provided on the outer wall of the outer damper 412. FIGS. 10-15 show how the damper 41 is mounted on the first cover 1 and the second cover 2. Referring to FIGS. 10-15 in combination with FIGS. 25, it can be seen that the damper 41 is arranged in the second limiting cavity 11*c* and sleeved on the third shaft body 213, such that the damper 41 and the spring 31 are located on two opposite sides of the first shaft body 211, and the damper 41 can be limited jointly by the second limiting cavity 11*c* and the third shaft body 213. Also, the inner damper 411 and the outer damper 412 of the damper 41 are respectively engaged with the second cover 2 and the first cover 1. Specifically, it can be seen in combination with FIGS. 11 and 25 that the second axial end of the first shaft body 211 is provided with two second engaging grooves 215, the two second engaging grooves 215 are arranged symmetrically about the central axis of the rotating shaft 21 and one-to-one correspond to two engaging blocks 413 on the inner damper 411, the two engaging blocks 413 are respectively engaged into the two second engaging grooves 215 so as to implement the engagement between the inner damper 411 and the rotating shaft 21, which in turn implements the engagement between the inner damper 411 and the second cover 2. Also, it can be seen in combination with FIGS. 11, 19 and 25 that the engaging opening 11*d* is provided in the groove wall of the second groove 11*k*, the engaging opening 11*d* is adapted to the boss 414 on the external damper 412, the boss 414 is engaged into the engaging opening 11*d* to implement the engagement between the outer damper 412 and the base 11, which in turn implements the engagement between the outer damper 412 and the first cover 1. On this basis, the outer damper 412 remains stationary relative to the first cover 1, and the inner damper 411 can rotate together with the second cover 2, so when the second cover 2 automatically returns under the drive of the spring 31, the inner damper 411 can generate a relative rotation relative to the outer damper 412, the viscous fluid located between the inner damper and the outer damper can reduce the closing speed of the second cover 2 by hindering the rotation of the inner damper 411, so as to provide sufficient time for the dismounting or mounting of the high-pressure lead-out member 105 and the fastener 106.

On the basis of the above-described arrangement, the operator may remove the external force after opening the protective cover 104 of this embodiment, and dismounts or mounts the high-voltage lead-out member 105, while the second cover 2 can be slowly closed at a constant speed under the combined action of the spring 31 and the damper 41 when the high-voltage lead-out member 105 is being dismounted or mounted, such that the safety issue caused by the operator forgetting to close the protective cover 104 can be avoided.

In this embodiment, the second cover 2 can be opened and closed at least 50 times, and has a large number of times of opening and closing and a long service life.

Next, the embodiments shown in FIGS. 28-36 will be further described.

The second embodiment shown in FIGS. 28-30 will first be further described.

As shown in FIGS. 28-30, in this embodiment, the cover closing mechanism 3 of the protective cover 104 comprises a plurality of connecting pieces 32 instead of the spring 31. The plurality of connecting pieces 32 are sequentially arranged at intervals in the third direction Y and each are connected to the first cover 1 and the second cover 2 of the protective cover 104, such that the second cover 2 can be rotated relative to the first cover 1. And, each of the connecting pieces 32 is made of PA6 material, and each of the connecting pieces 32 has a thickness less than or equal to 0.7 mm (for example, 0.4 mm) and a width equal to or greater than 3 mm. Thus, the connecting pieces 32 form a thin-walled hinge having an excellent performance, and can be repeatedly folded during the rotation of the second cover 2, and after the external force for opening the second cover 2 is removed, the second cover 2 can be driven to rotate in the second direction of rotation to achieve the automatic return of the second cover 2, so as to avoid the safety issue caused by the operator forgetting to close the protective cover 104. An outer surface of the connecting piece 32 is a planar, and the connecting piece 32 is connected to one end of the first cover 1 in the second direction X. The outer surface of the connecting piece 32 is a surface of the connecting piece 32 facing away from the opening 15.

And, as shown in FIG. 30, in this embodiment, the free end of the second cover 2 is connected to the first cover 1 by means of the snap-fit structure 6. Specifically, the snap-fit structure 6 comprises a limiting block 61 and a limiting groove 62, where the limiting block 61 is arranged at the free end of the second cover 2, the limiting groove 62 is arranged in the first cover 1, and the limiting block 61 is engaged with the limiting groove 62. The first cover 1 is provided with an abutment 115 and a bump 116, the abutment 115 and the bump 116 are arranged in a spaced manner in the first direction Z, and the spacing therebetween forms the limiting groove 62, that is to say, the limiting groove 62 is located between the abutment 115 and the bump 116. The abutment 115 and the bump 116 are specifically provided on the supporting portion 112 of the first cover 1.

In addition, as shown in FIG. 30, in this embodiment, the grip portion 5 is provided on the second cover 2 for use by the operator to open or close the second cover 2.

On the basis of the above-described arrangement, the operator may remove the external force after opening the protective cover 104 of this embodiment, and dismounts or mounts the high-voltage lead-out member 105, while the second cover 2 can be rotated by a certain angle in the second direction of rotation under the action of the connecting pieces 32 when the high-voltage lead-out member 105 is being dismounted or mounted, and the operator then manually engages the limiting block 61 into the limiting groove 62, such that the second cover 2 is fully closed, thereby avoiding the safety issue caused by the operator forgetting to close the protective cover 104.

FIGS. 31-36 show several variants of the embodiment shown in FIGS. 28-30. Therefore, only the differences between these variants and the embodiment shown in FIGS. 28-30 will be emphatically introduced in the following to simplify the description.

FIG. 31 illustrates a first variant of the embodiment shown in FIGS. 28-30. In this first variant, the outer surface of each of the connecting pieces 32 is a curved surface instead of a flat surface.

FIG. 32 shows a second variant of the embodiment shown in FIGS. 28-30. In this second variant, the positions where the connecting piece 32 are connected are changed, and the connecting pieces 32 are not connected to the end of the first cover 1 in the second direction X, but is connected to the end of the first cover 1 in the third direction Y.

Figure 33:
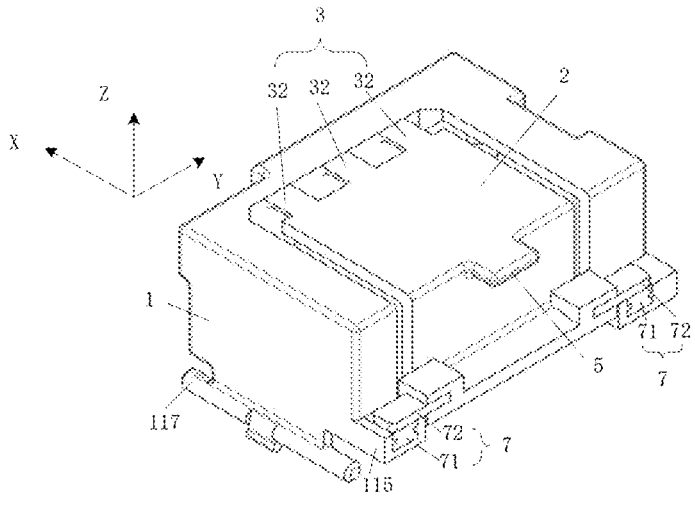
FIG. 33 is a schematic perspective view of a protective
cover in a closed state according to a fifth embodiment of the
present application.
Figures 34, 35:
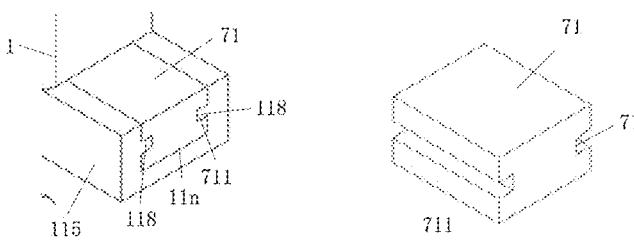
FIG. 34 is a schematic diagram of a first magnetic
attraction member mounted on a first cover according to the
fifth embodiment of the present application.
FIG. 35 is a schematic perspective view of the first magnetic attraction member according to the fifth embodiment of the present application.
Figure 36:
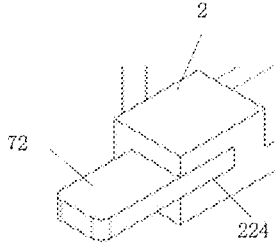
FIG. 36 is a schematic diagram of a second magnetic attraction member mounted on a second cover according to the fifth embodiment of the present application.

FIGS. 33-36 show a third variant of the embodiment shown in FIGS. 28-30. In this third variant, the free end of the second cover 2 is connected to the first cover 1 by means of the magnetic attraction structure 7 instead of the snap-fit structure 6. As shown in FIGS. 33, the magnetic attraction structure 7 comprises a first magnetic attraction member 71 and a second magnetic attraction member 72, where the first magnetic attraction member 71 is arranged on the first cover 1, the second magnetic attraction member 72 is arranged at the free end of the second cover 2, and the first magnetic attraction member 71 and the second magnetic attraction member 72 magnetically attract each other. The first magnetic attraction member 71 is a magnet, which is engaged with the first cover 1. As shown in FIGS. 34-35, the abutment 115 of the first cover 1 is provided with a mounting groove 11n, the first magnetic attraction member 71 is located in the mounting groove 11n, and an inner wall of the mounting groove 11n is provided with projecting ribs 118; accordingly, the first magnetic attraction member 71 is provided with recesses 711, and the projecting ribs 118 are embedded in the recesses 711 to implement engagement between the first magnetic attraction member 71 and the first cover 1. The second magnetic attraction member 72 is a metal part (e.g., a stainless steel part) that is engaged with the second cover 2. As shown in FIGS. 36, a slot 224 is provided in the second cover 2, and the second magnetic attraction member 72 is engaged in the slot 224 to implement the engagement between the second magnetic attraction member 72 and the second cover 2. In this way, when the second cover 2 automatically returns at a certain angle under the action of the connecting pieces 32, the second magnetic attraction member 72 on the second cover 2 is attracted by the first magnetic attraction member 71 on the first cover 1, such that the second cover 2 can continue to be rotated in the second direction of rotation under the action of the magnetic attraction structure 7 until the second cover returns to the closed position to achieve full closing and the effect of automatic closing, and the second cover 2 can be automatically closed without a manual operation by the operator.

It can be seen that the protective cover 104 provided in the embodiments of the present application has the automatic closing function, can effectively prevent the issue of accidental electric shock caused by the fact that the operator forgets to close the protective cover 104, resulting in large-area exposure of the high-voltage lead-out member 105, and the safety performance of the battery 10 and the power consuming device 100 can be effectively improved.

On the basis of the protective cover 104 of the various embodiments of the present application, the present application further provides a method for manufacturing the protective cover 104. Referring to FIG. 37, the manufacturing method comprises:

step S100, during which a first cover 1 is provided, the first cover 1 being configured to be fixed to a frame 102 of a battery 10, the first cover 1 being provided with an accommodating cavity 14 for accommodating a high-voltage lead-out member 105, and the accommodating cavity 14 having an opening 15 for exposing the high-voltage lead-out member 105;

step S200, during which a second cover 2 is provided, the second cover 2 being rotatably arranged on the first cover 1 and opening and respectively closing the opening 15 when rotated relative to the first cover 1 in a first direction of rotation and a second direction of rotation; and step S300, during which a cover closing mechanism 3 is provided, the cover closing mechanism 3 being connected to the first cover 1 and the second cover 2, and causing the second cover 2 to rotate in the second direction of rotation after the second cover 2 is opened and an external force for opening the second cover 2 is removed.

The protective cover 104 manufactured by the above method has the automatic closing function, and can improve the safety performance of the battery 10 and the power consuming device 100.

In the method, the order of steps S100, S200 and S300 is not limited and can be flexibly adjusted.

Finally, it should be noted that the above embodiments are merely used for illustrating rather than limiting the technical solution of the present application. Although the present application has been illustrated in detail with reference to the foregoing embodiments, it should be understood by those of ordinary skill in the art that the technical solutions recorded in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, as long as there is no structural conflict. The present application is not limited to the specific embodiments disclosed herein, but includes all technical solutions that fall within the scope of the claims.

The invention claimed is:

1. A protective cover, comprising:
a first cover to be fixed to a frame of a battery, the first cover being provided with an accommodating cavity for accommodating a high-voltage lead-out structure, and the accommodating cavity having an opening for exposing the high-voltage lead-out structure;
a second cover rotatably arranged on the first cover and the opening and respectively closing the opening when rotated relative to the first cover in a first direction of rotation and a second direction of rotation; and
a cover closing structure connected to the first cover and the second cover, and causing the second cover to rotate in the second direction of rotation after the second cover is opened and an external force for opening the second cover is removed,
wherein the cover closing structure comprises an elastic structure, the elastic structure is connected to the first cover and the second cover, and an elastic restoring force of the elastic structure drives the second cover to rotate in the second direction of rotation after the external force for opening the second cover is removed,
wherein the elastic structure comprises a spring, with a first end of the spring being connected to the first cover, and a second end of the spring being connected to the second cover, such that the second cover is rotated in the second direction of rotation in response to the elastic restoring force of the spring after the external force for opening the second cover is removed,
wherein a spring limiting cavity is provided in the first cover, and the spring is arranged in the spring limiting cavity, and
wherein the first cover comprises a base and a spring cover cap, the base being provided with a first groove, and the spring cover cap being removably connected to the base and covering the first groove to form the spring limiting cavity.

2. The protective cover according to claim 1, wherein the base is provided with a groove, a connecting rib is provided on the spring cover cap, a convex rib is provided on the connecting rib, the connecting rib is engaged into the groove and is in an interference fit with the groove by means of the convex rib to prevent the connecting rib from sliding out of the groove.

3. The protective cover according to claim 1, wherein the second cover comprises a rotating shaft and a cover body, the rotating shaft being rotatably arranged on the first cover, the cover body being connected to the rotating shaft and opening or closing the opening, and the second end of the spring being connected to the rotating shaft.

4. The protective cover according to claim 1, further comprising a speed reducer, the speed reducer being connected to the first cover and the second cover, and applying, when the cover closing structure causes the second cover to rotate in the second direction of rotation, an acting force to the second cover in the first direction of rotation to reduce a closing speed of the second cover.

5. The protective cover according to claim 4, wherein the speed reducer and the spring of the cover closing structure are arranged on two opposite sides of the second cover.

6. The protective cover according to claim 4, wherein a speed reducer limiting cavity is provided in the first cover, and the speed reducer is provided in the speed reducer limiting cavity.

7. The protective cover according to claim 6, wherein the first cover comprises the base and a speed reducer cover cap, the first groove being provided in the base, and the speed reducer cover cap being removably connected to the base and covering the first groove to form the speed reducer limiting cavity.

8. The protective cover according to claim 1, wherein a free end of the second cover is connected to the first cover by means of a snap-fit structure or a magnetic attraction structure.

9. The protective cover according to claim 1, wherein the first cover has a limiting portion, the limiting portion being in contact with the second cover to limit the maximum opening angle of the second cover.

10. The protective cover according to claim 9, wherein the limiting portion limits the maximum opening angle of the second cover to be equal to or greater than 180°.

11. The protective cover according to claim 1, wherein a grip portion is provided on the second cover.

12. A battery, comprising a battery cell, a frame and a high-voltage lead-out structure, the battery cell being provided in the frame, and the high-voltage lead-out structure being provided on the frame and electrically connected to the battery cell, wherein the battery further comprises a protective cover according to claim 1.

13. A power consuming device, comprising the battery according to claim 12, the battery being configured for supplying electric energy.

14. A protective cover, comprising:
a first cover to be fixed to a frame of a battery, the first cover being provided with an accommodating cavity for accommodating a high-voltage lead-out structure, and the accommodating cavity having an opening for exposing the high-voltage lead-out structure;
a second cover rotatably arranged on the first cover and the opening and respectively closing the opening when rotated relative to the first cover in a first direction of rotation and a second direction of rotation; and
a cover closing structure connected to the first cover and the second cover, and causing the second cover to rotate in the second direction of rotation after the second cover is opened and an external force for opening the second cover is removed,
wherein the cover closing structure comprises an elastic structure, the elastic structure is connected to the first cover and the second cover, and an elastic restoring force of the elastic structure drives the second cover to rotate in the second direction of rotation after the external force for opening the second cover is removed, and
wherein the elastic structure comprises connecting pieces, and the second cover is rotatably connected to the first cover by means of the connecting pieces, such that the elastic restoring forces of the connecting pieces drive the second cover to rotate in the second direction of rotation after the external force for opening the second cover is removed.

15. The protective cover according to claim 14, wherein the connecting pieces meet at least one of:
the thickness of the connecting piece being less than or equal to 0.7 mm;
the tensile strength of the connecting piece being between 20 and 50 MPa;

the elongation at break of the material of the connecting piece being less than or equal to 15%;

the bending strength of the material of the connecting piece being between 30 and 80 MPa;

the Charpy notched impact strength of the material of the connecting piece being less than or equal to 35 KJ/m$^2$; or the width of the connecting piece being greater than or equal to 3 mm.

16. The protective cover according to claim 14, wherein the cover closing structure comprises at least two connecting pieces, the at least two connecting pieces being arranged in a spaced manner in an extension direction of an axis of rotation of the second cover.

17. A protective cover, comprising:

a first cover to be fixed to a frame of a battery, the first cover being provided with an accommodating cavity for accommodating a high-voltage lead-out structure, and the accommodating cavity having an opening for exposing the high-voltage lead-out structure;

a second cover rotatably arranged on the first cover and the opening and respectively closing the opening when rotated relative to the first cover in a first direction of rotation and a second direction of rotation;

a cover closing structure connected to the first cover and the second cover, and causing the second cover to rotate in the second direction of rotation after the second cover is opened and an external force for opening the second cover is removed; and a speed reducer, wherein the cover closing structure comprises an elastic structure, the elastic structure is connected to the first cover and the second cover, and an elastic restoring force of the elastic structure drives the second cover to rotate in the second direction of rotation after the external force for opening the second cover is removed, wherein the elastic structure comprises a spring, with a first end of the spring being connected to the first cover, and a second end of the spring being connected to the second cover, such that the second cover is rotated in the second direction of rotation in response to the elastic restoring force of the spring after the external force for opening the second cover is removed, and wherein the speed reducer is connected to the first cover and the second cover, and applies, when the cover closing structure causes the second cover to rotate in the second direction of rotation, an acting force to the second cover in the first direction of rotation to reduce a closing speed of the second cover.

18. The protective cover according to claim 17, wherein the speed reducer and the spring of the cover closing structure are arranged on two opposite sides of the second cover.

19. The protective cover according to claim 17, wherein a speed reducer limiting cavity is provided in the first cover, and the speed reducer is provided in the speed reducer limiting cavity.

20. The protective cover according to claim 19, wherein the first cover comprises a base and a speed reducer cover cap, a first groove being provided in the base, and the speed reducer cover cap being removably connected to the base and covering the first groove to form the speed reducer limiting cavity.

* * * * *